United States Patent
Maeda

(10) Patent No.: US 7,881,175 B2
(45) Date of Patent: Feb. 1, 2011

(54) SIGNAL GENERATING APPARATUS AND METHOD, RECORDING APPARATUS AND METHOD, REPRODUCING APPARATUS AND METHOD, RECORDING/REPRODUCING APPARATUS AND METHOD, COMPUTER PROGRAM, AND RECORDING MEDIUM

(75) Inventor: Takanori Maeda, Saitama (JP)

(73) Assignee: Pioneer Corporation, Tokyo (JP)

( * ) Notice: Subject to any disclaimer, the term of this patent is extended or adjusted under 35 U.S.C. 154(b) by 793 days.

(21) Appl. No.: 11/667,961

(22) PCT Filed: Nov. 17, 2005

(86) PCT No.: PCT/JP2005/021105

§ 371 (c)(1),
(2), (4) Date: Jun. 20, 2007

(87) PCT Pub. No.: WO2006/054630

PCT Pub. Date: May 25, 2006

(65) Prior Publication Data

US 2007/0291605 A1    Dec. 20, 2007

(30) Foreign Application Priority Data

Nov. 17, 2004   (JP) ............................. 2004-333227

(51) Int. Cl.
G11B 7/00 (2006.01)
(52) U.S. Cl. ................. 369/126; 369/124.03; 369/47.48
(58) Field of Classification Search ................. 369/47.1, 369/47.15, 47.2, 47.24, 47.28, 47.48, 53.29, 369/124.03, 124.11, 47.27, 126
See application file for complete search history.

(56) References Cited

U.S. PATENT DOCUMENTS

| | | | | |
|---|---|---|---|---|
| 5,805,560 A | * | 9/1998 | Kuroda et al. | 369/126 |
| 7,242,661 B2 | * | 7/2007 | Cho et al. | 369/126 |
| 7,436,748 B2 | * | 10/2008 | Cherubini et al. | 369/101 |
| 7,502,304 B2 | * | 3/2009 | Maeda et al. | 369/126 |

FOREIGN PATENT DOCUMENTS

| | | |
|---|---|---|
| JP | 59-180816 | 10/1984 |
| JP | 09-512379 | 12/1997 |
| JP | 2003-085969 | 3/2003 |

OTHER PUBLICATIONS

International Search Report for PCT/JP2005/021105 mailed Feb. 21, 2006 (English and Japanese).

* cited by examiner

Primary Examiner—Nabil Z Hindi
(74) Attorney, Agent, or Firm—Nixon & Vanderhye, PC

(57) ABSTRACT

A recording/reproducing apparatus (100) is provided with comprising: recording devices (131a-131e) for recording record signals (WS1-WS5) in parallel and in synchronization with a record clock; a signal generating device (143) for generating record signals such that a reproduction clock synchronized with the record clock can be generated on the basis of the reproduced record signals, if the plurality of record signals are reproduced in parallel; reproducing devices (131a-131e) for reproducing the record signals in parallel; and a clock generating device (154) for generating a reproduction clock.

6 Claims, 10 Drawing Sheets

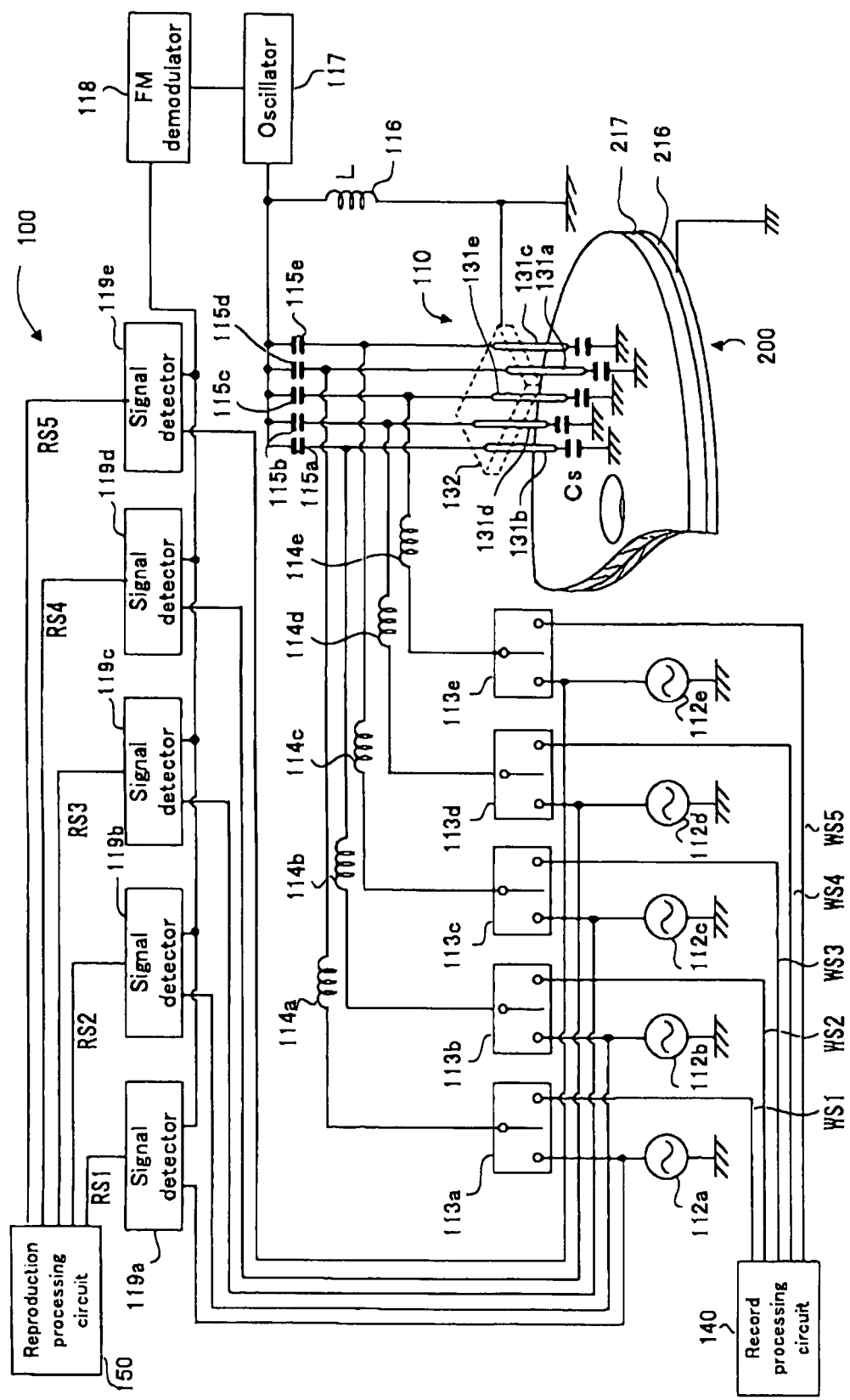
[FIG. 1]

[FIG. 2]
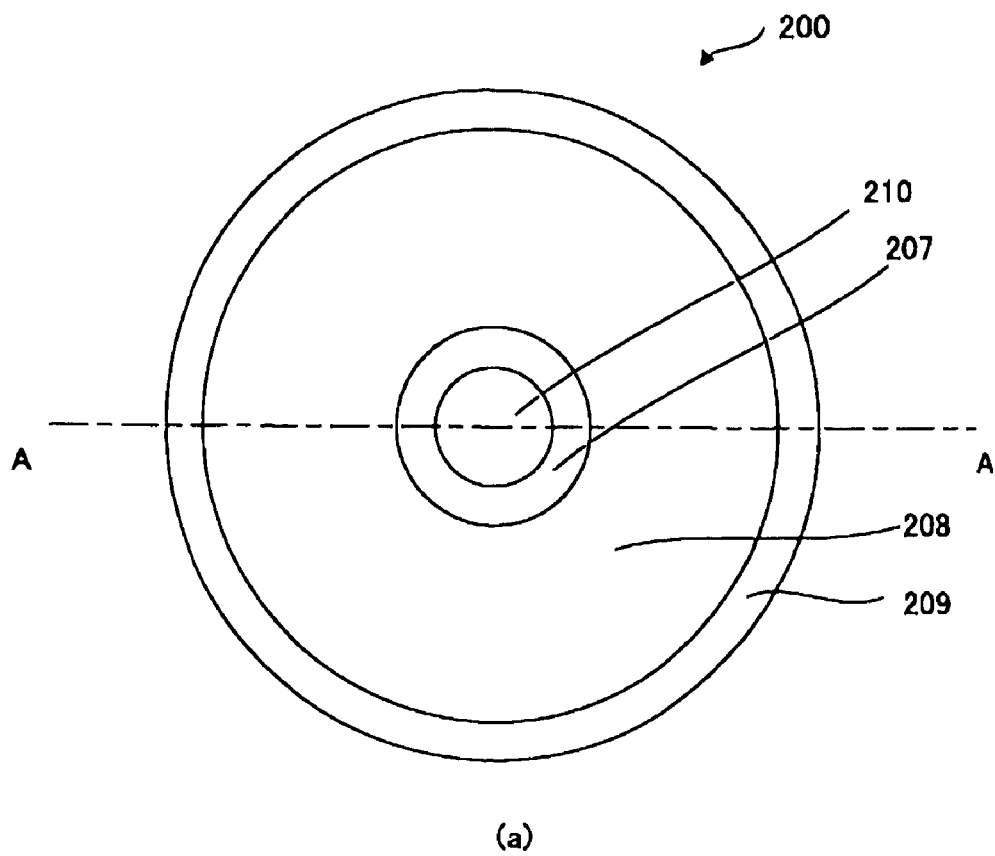
(a)
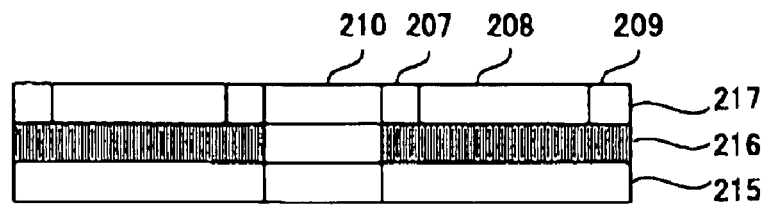
(b)

[FIG. 3]
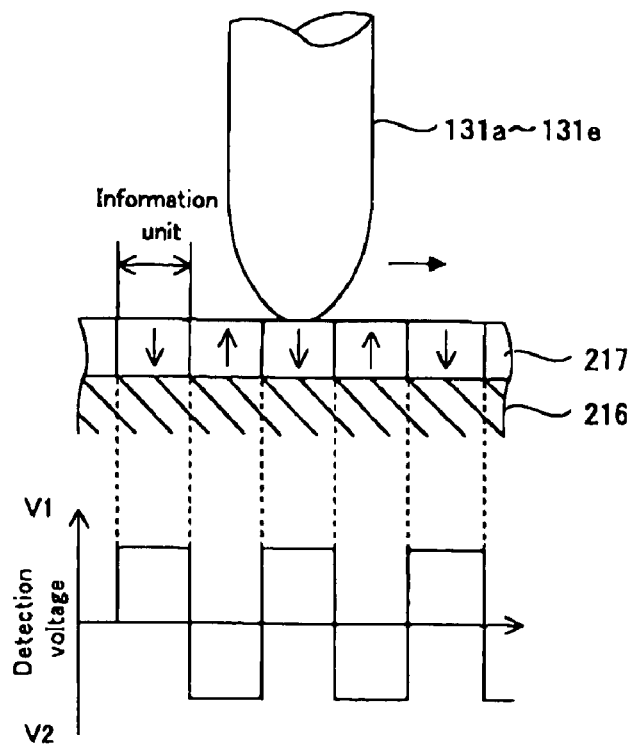
[FIG. 4]
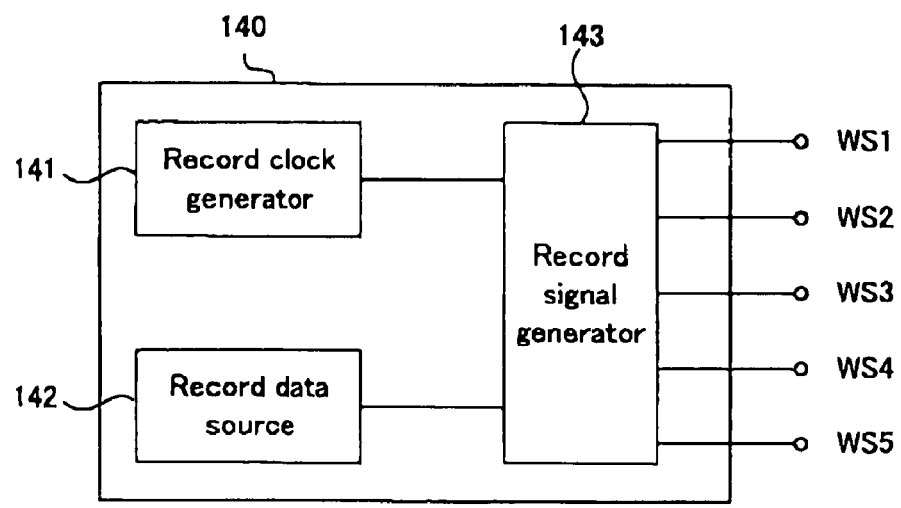

[FIG. 5]
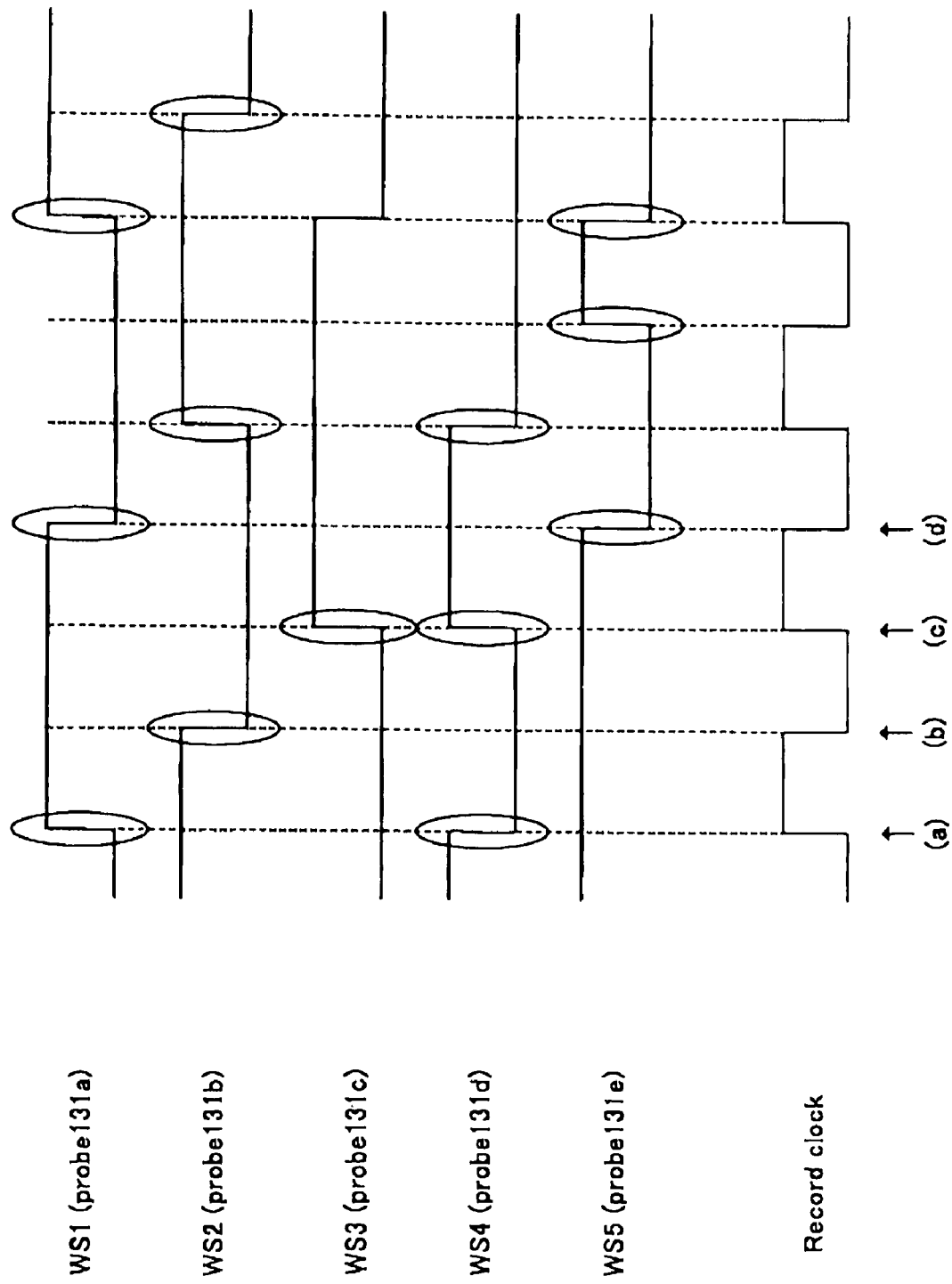

[FIG. 6]
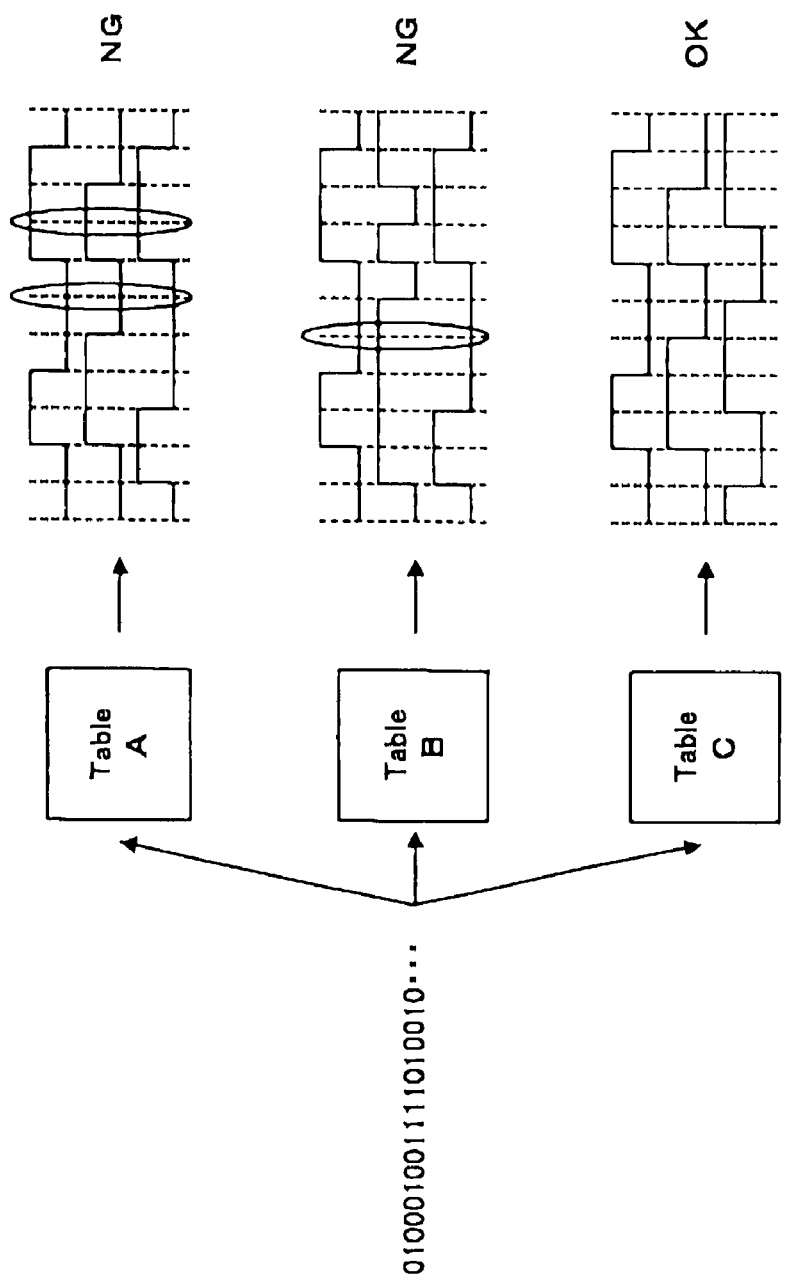

[FIG. 7]
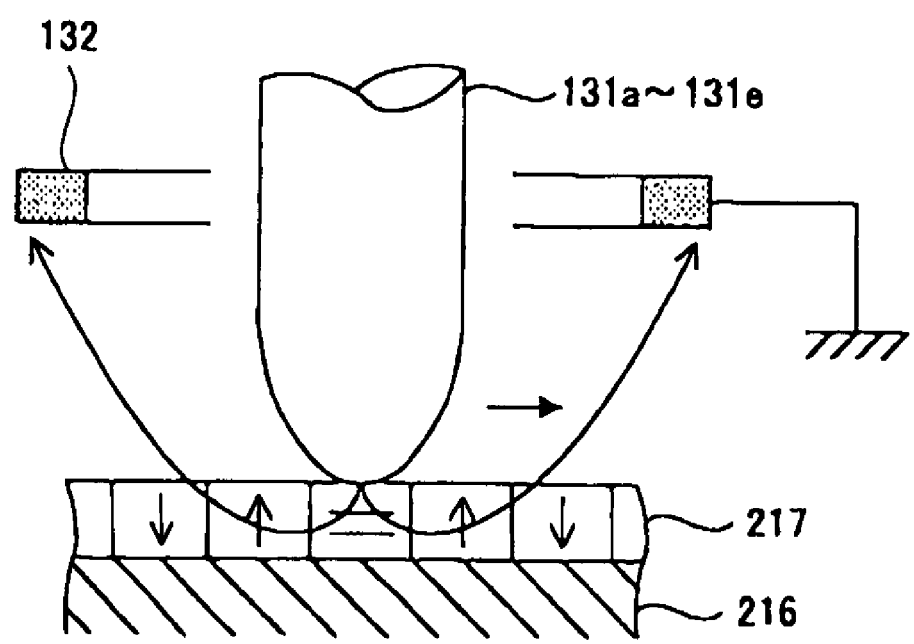

[FIG. 8]
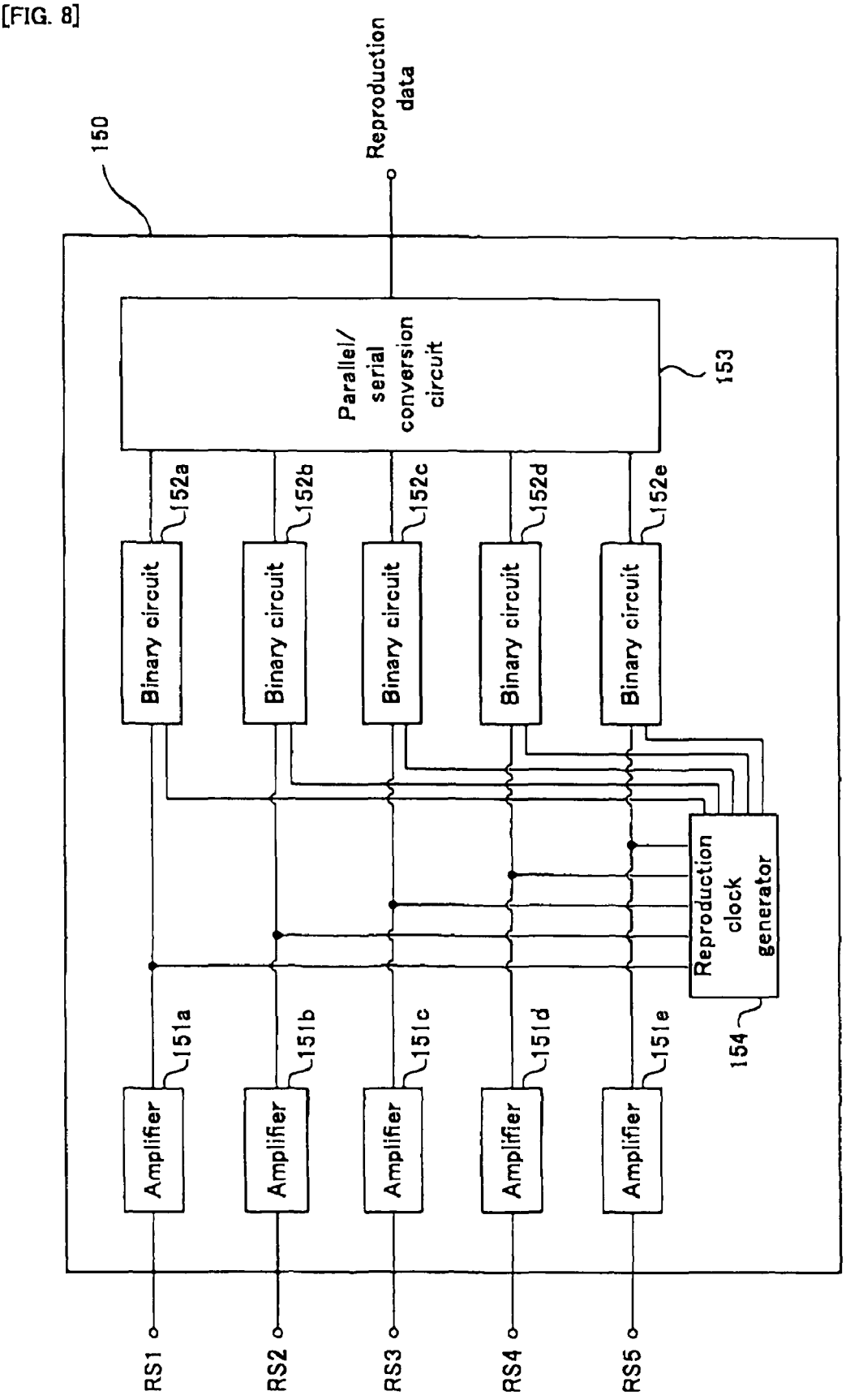

[FIG. 9]
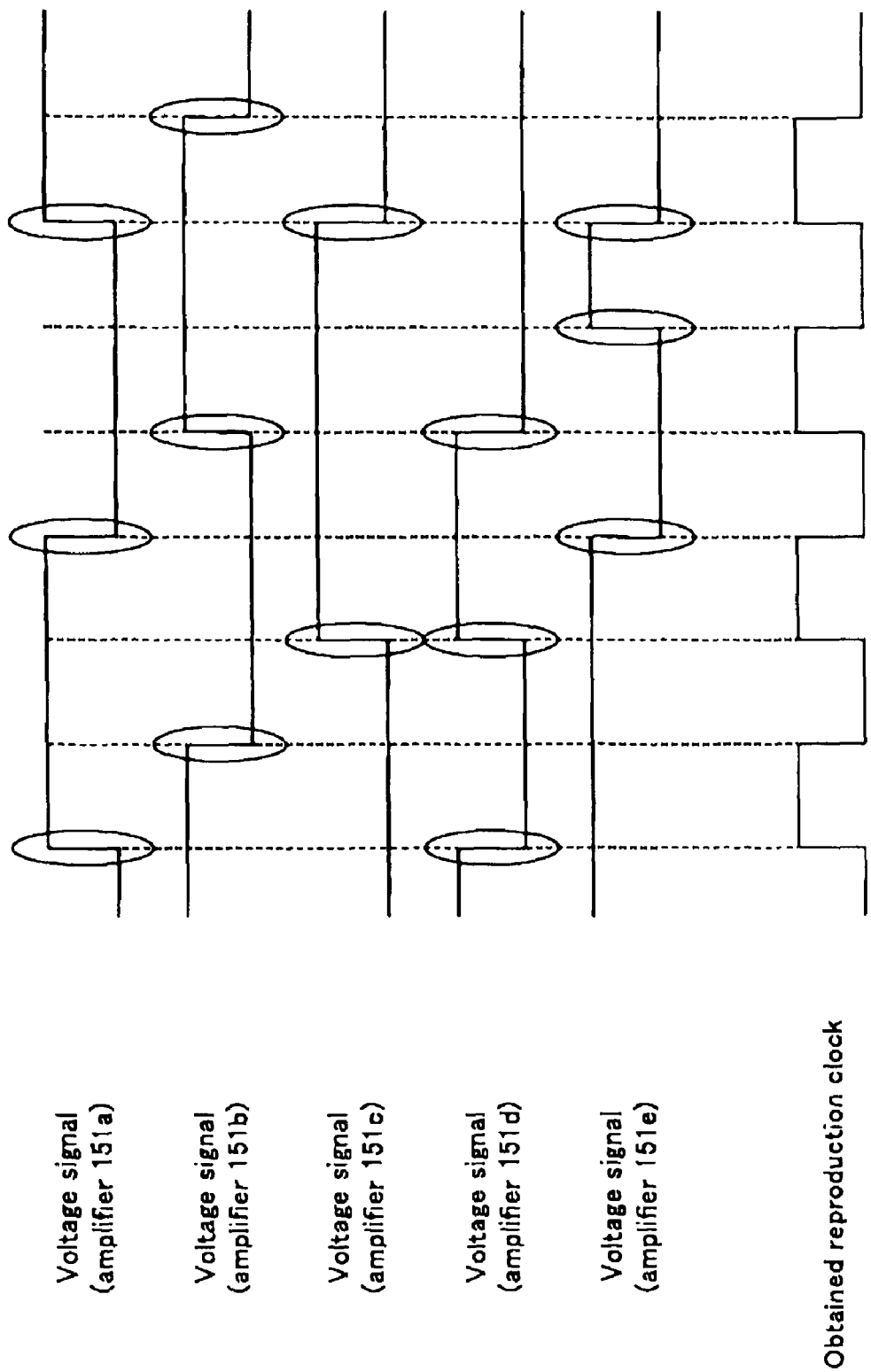

[FIG. 10]
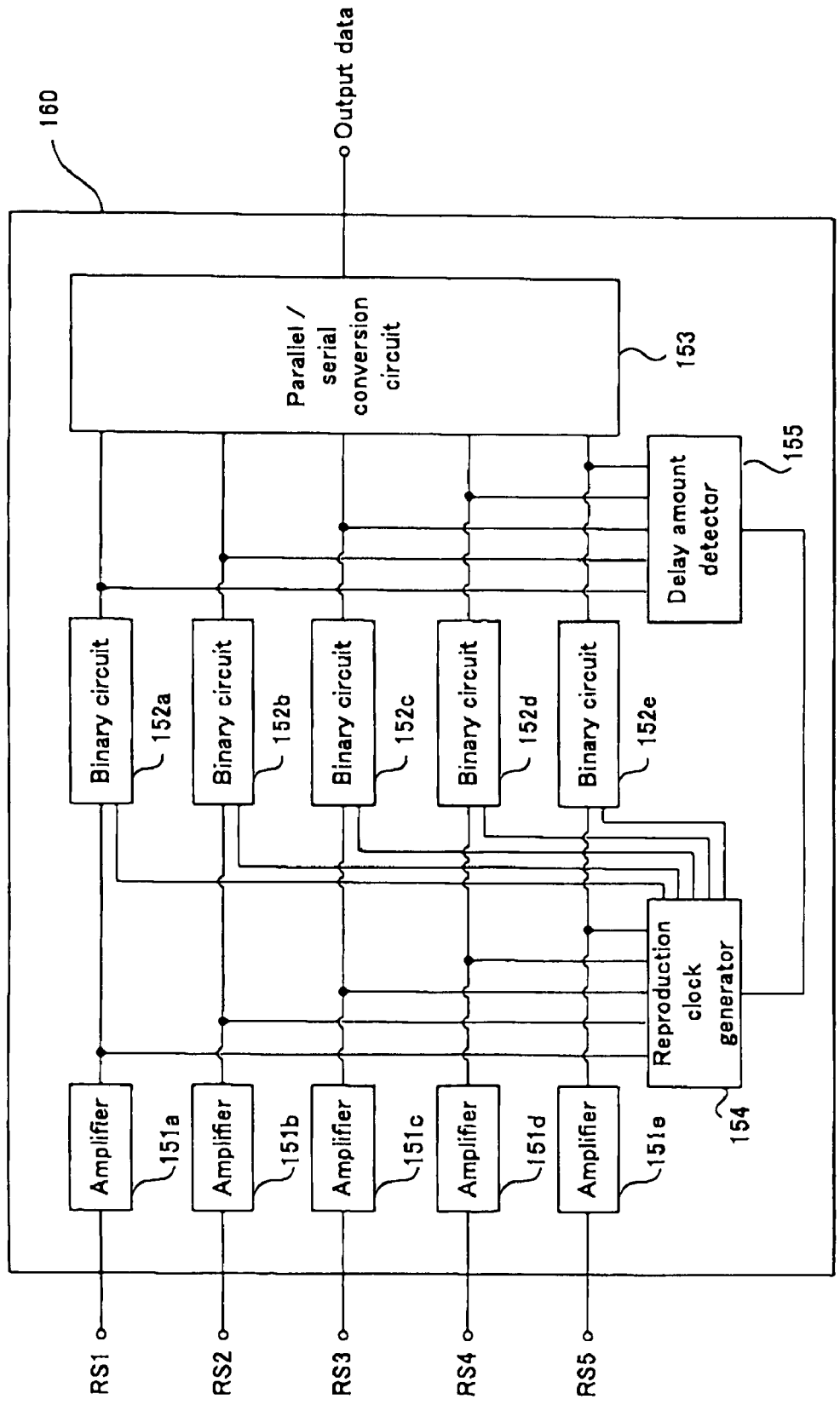

[FIG. 11]
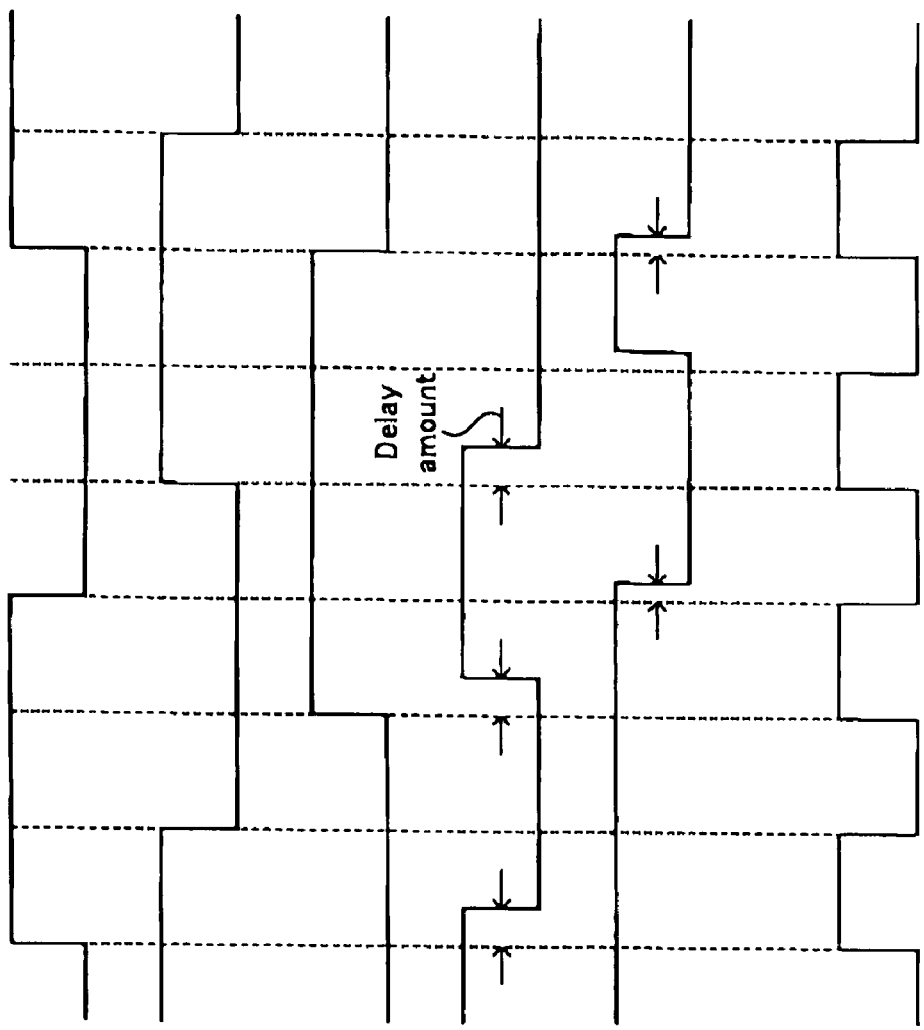

SIGNAL GENERATING APPARATUS AND METHOD, RECORDING APPARATUS AND METHOD, REPRODUCING APPARATUS AND METHOD, RECORDING/REPRODUCING APPARATUS AND METHOD, COMPUTER PROGRAM, AND RECORDING MEDIUM

This application is the U.S. national phase of International Application No. PCT/JP2005/021105 filed 17 Nov. 2005, which designated the U.S. and claims priority to JP 2004-333227 filed 17 Nov. 2004, the entire contents of each of which are hereby incorporated by reference.

TECHNICAL FIELD

The present invention relates to a signal generating apparatus for and method of generating data to be recorded by a recorder and data to be reproduced by a player, a recording apparatus and method provided with such a signal generating apparatus, a reproducing apparatus and method provided with such a signal generating apparatus, a recording/reproducing apparatus and method provided with such a signal generating apparatus, a computer program for operation as such a signal generating apparatus, recording apparatus, reproducing apparatus, and recording/reproducing apparatus, and a recording medium on which signals generated by the signal generating apparatus are recorded.

BACKGROUND ART

The inventors of the present invention has proposed a technology of a recording/reproducing apparatus using SNDM (Scanning Nonlinear Dielectric Microscopy) for nanoscale analysis of a dielectric recording medium. In the SNDM, it is possible to increase the resolution of measurement to sub-nanometer, by using an electrically conductive cantilever (or probe) having a small projection portion on its tip, which is used for atomic force microscopy (AFM) or the like. Recently, a super high-density recording/reproducing apparatus has been developed, wherein the apparatus records data into a recording medium having a recording layer made of a ferroelectric material by using the technology of SNDM (refer to a patent document 1).

On the recording/reproducing apparatus using such SNDM, the information is reproduced by detecting the positive/negative direction of polarization of the recording medium. This is performed by using the fact that the oscillation frequency of a LC oscillator, which includes a high-frequency feedback amplifier including a L component, the electrically conductive probe mounted on the amplifier, and the capacitance Cs of a ferroelectric material under the probe, is changed by a change ΔC in small capacitance, which is caused by the various amount of a nonlinear dielectric constant caused by the distribution of the positive/negative polarization. Namely, this is performed by detecting a change in the distribution of the positive/negative polarization, as a change in oscillation frequency Δf.

Moreover, an alternating electric field whose frequency is sufficiently lower than the oscillation frequency is applied in order to detect the difference in the positive/negative polarization, and thereby the oscillation frequency changes with the alternating electric field. At the same time, a ratio of the change in the oscillation frequency, including a code or sign, is determined from the nonlinear dielectric constant of the ferroelectric material under the probe. Moreover, by FM (Frequency Modulation)-demodulating and extracting a component caused by the alternating electric field from a high-frequency signal of the LC oscillator which is FM-modulated in accordance with the change ΔC in the small capacitance associated with the application of the alternating electric field, the record information recorded in the ferroelectric recording medium is reproduced.

In reproducing such data, it is necessary to generate a clock as a reproduction reference in order to reproduce the data in right timing. At this time, if length modulation recording in which the lengths of blanks or record marks formed by a distribution of positive and negative polarization or the like are set to integral multiples of a clock cycle is performed, the clock as the reproduction reference is generated on the basis of reading signals of data. Then, on the basis of the generated clock, the data reading and reproduction are performed. Moreover, on a recording/reproducing apparatus in such an aspect that many data are simultaneously read with a multi-probe (or probe array), clocks are independently generated for respective probes. By this, the data reading is performed for the respective probes. Moreover, the combination and reproduction of the read data are performed for the respective probes by using independent clocks aside from the clocks independently generated for the respective probes.

Patent document 1: Japanese Patent Application Laying Open NO. 2003-085969

However, in the case where data is recorded at super high density as in the recording/reproducing apparatus or the like using SNDM, there is such a technical problem that a phase shift of the reversed edges of actual reading signals becomes significant with respect to the clock as the reproduction reference. This leads to an increase of jitter upon reproduction, causing the deterioration of a data reproduction quality, which is not preferable. Considering that the clock as the reproduction reference is generated on the basis of the timing at which the reversed edges or the like of the reading signals appear and the lengths of pulses of the reading signals or the like, the phase shift of the edges of the reading signals may lead to such a technical problem that the clock as the reproduction reference cannot be preferably generated.

In order to solve the above-mentioned problems, it is therefore an object of the present invention to provide a signal generating apparatus and method, a recording apparatus and method, a reproducing apparatus and method, a recording/reproducing apparatus and method, in all of which a clock used for data reproduction or the like can be preferably generated, a computer program for making a computer function as such a signal generating apparatus, recording apparatus, reproducing apparatus, and recording/reproducing apparatus, and a recording medium on which data generated by the signal generating apparatus is recorded.

(Signal Generating Apparatus or Method)

The above object of the present invention can be achieved by a signal generating apparatus for generating a plurality of signals each of which is outputted to corresponding output destination of a plurality of output destinations, in synchronization with a first clock and in association with the plurality of output destinations, the signal generating apparatus provided with: an obtaining device for obtaining a data source for generating the plurality of signals; and a signal generating device for generating each of the plurality of signals in association with the corresponding output destination, from the data source, such that a second clock synchronized with the first clock can be generated on the basis of the plurality of signals reproduced in parallel, if the plurality of signals are reproduced in parallel.

According to the signal generating apparatus of the present invention, the plurality of signals which are respectively outputted to the plurality, of output destinations are generated from the data source obtained by the obtaining device. The plurality of signals are generated in synchronization with the first clock (i.e. in accordance with the timing of the first clock), Specifically, by virtue of the operation of the signal generating device, one signal to be outputted to one of the plurality of output destinations and another signal to be outputted to another one of the plurality of output destinations and the like are generated. Namely, the plurality of signals each of which is to be outputted to the corresponding output destination of the plurality of output destinations are generated. Incidentally, in the present invention, since the signals are generated from the obtained data source, the signal generating apparatus can be deemed to be equivalent to a modulating apparatus from the viewpoint that the obtained data source is modulated and then the signals are generated.

At this time, the signal generating device generates such plurality of signals that the second clock which is synchronized with the first clock (i.e. which is equal to the first clock, which has substantially the same cycle as the first clock has, or which is based on the cycle of the first clock) can be generated from the reproduction results if the plurality of signals are reproduced in parallel. The second clock can be referred to in the case where the generated signals are reproduced or in similar cases. Namely, if the plurality of signals generated by the signal generating apparatus are reproduced in parallel, then it is possible to preferably generate, from the reproduction results, the second clock used in the reproduction of the plurality of signals or in similar cases. Particularly, since the second dock can be generated from the plurality of signals reproduced in parallel (i.e. a flux of signals), the second clock can be generated more preferably than such an aspect that the clock is generated from a single signal, as described in Background Art. Namely, as compared to the aspect that the clock is obtained from the reproduction result of the single signal, since the reproduction results of the plurality of signals can be checked to each other in the present invention, the second clock which is more highly reliable can be generated, preferably.

Consequently, according to the signal generating apparatus of the present invention, it is possible to preferably generate the clock used in the data reproduction or the like.

In one aspect of the signal generating apparatus of the present invention, the signal generating device generates each of the plurality of signals such that a reversed edge appears on a waveform of at least one of the plurality of signals in every time unit synchronized with the first clock.

According to this aspect, the reversed edge (i.e. the rising edge portion or trailing edge portion of a pulse waveform) appears on the waveform of the at least one of the plurality of signals in every time unit synchronized with the first clock. At this time, the "time unit synchronized with the first clock" widely includes even a time unit corresponding to a cycle n times or 1/n times as long as the cycle of the first clock (i.e. a time unit based on the cycle of the first clock), in addition to the same time unit as the cycle of the first clock. For example, if the cycle of the first clock is 0.1 µs (a frequency of 10 MHz), its double time unit, 0.2 µs (a frequency of 8 MHz), and a ½-time time unit, 0.05 µs (a frequency of 32 MHz), are also included in the "time unit synchronized with the first clock". Then, as detailed later, if the reversed edges of the signals reproduced in parallel are sampled, the cycle, in which the reversed edges appear, directly becomes the cycle of the second clock. Thus, it is possible to generate the second clock, preferably and relatively easily.

In another aspect of the signal generating apparatus of the present invention, the signal generating device generates each of the plurality of signals such that a length of a peak of a waveform of each of the plurality of signals corresponds to an integral multiple of a cycle of the first clock and such that a signal change corresponding to the cycle of the first clock appears on a waveform of at least one of the plurality of signals.

According to this aspect, the plurality of signals are generated in accordance with a length-modulation method based on the cycle of the first clock. Specifically, each of the plurality of signals is generated such that the length of the peak of the waveform of each of the plurality of signals corresponds to an integral multiple of the cycle of the first clock. Then, in conformity with the length-modulation method, the reproduction clock can be preferably generated, as described above.

In another aspect of the signal generating apparatus of the present invention, the signal generating device generates each of the plurality of signals on the basis of at least one of a conversion table and a predetermined conversion pattern.

According to this aspect, by using the conversion table and the conversion pattern, it is possible to relatively easily generate, from the data source, such plurality of signals that can preferably generate the second clock. Namely, it is only necessary to convert the data source to the plurality of signals in accordance with the conversion aspect indicated by the conversion table and the conversion pattern, so that the plurality of signals can be generated, relatively easily. Of course, the conversion table and the conversion pattern are defined so as to generate such plurality of signals that can preferably generate the second clock.

The above object of the present invention can be also achieved by a signal generating method of generating a plurality of signals each of which is outputted to corresponding output destination of a plurality of output destinations, in synchronization with a first clock and in association with the plurality of output destinations, the signal generating method provided with: an obtaining process of obtaining a data source for generating the plurality of signals; and a signal generating process of generating each of the plurality of signals in association with the corresponding output destination, from the data source, such that a second clock synchronized with the first clock can be generated on the basis of the plurality of signals reproduced in parallel, if the plurality of signals are reproduced in parallel.

According to the signal generating method of the present invention, it is possible to receive the various benefits owned by the above-mentioned signal generating apparatus of the present invention.

Incidentally, in response to the various aspects of the above-mentioned signal generating apparatus of the present invention, the signal generating method of the present invention can also adopt various aspects.

(Recording Apparatus or Method)

The above object of the present invention can be also achieved by a recording apparatus provided with: a plurality of recording devices, each of which records corresponding record signal of a plurality of record signals in parallel and in synchronization with a record clock; and a signal generating device for generating each of the plurality of record signals in association with the corresponding recording device such that a reproduction clock synchronized with the record clock can be generated on the basis of the plurality of record signals reproduced in parallel, if the plurality of record signals are reproduced in parallel.

According to the recording apparatus of the present invention, the record signals are recorded into a recording medium or the like by the respective recording devices. Specifically, one of the plurality of recording devices records one of the plurality of record signals corresponding to the one recording device, in synchronization with the record clock. Moreover, another one of the plurality of recording devices records another one of the plurality of record signals corresponding to the another recording device, in synchronization with the record clock. This recording operation is performed in parallel (or simultaneously, or substantially simultaneously) on the plurality of recording devices.

At this time, the plurality of record signals are generated by the operation of the signal generating device. Specifically, by virtue of the operation of the signal generating device, the plurality of record signals is generated so as to generate the reproduction clock synchronized with the record clock from the reproduction result of the plurality of record signals if the plurality of record signals are reproduced in parallel. Then, each of the generated signals is supplied to the corresponding recording device the plurality of the recording devices. For example, one record signal generated correspondingly to one of the plurality of recording devices is supplied to the one recording device, and another record signal generated correspondingly to another one of the plurality of recording devices is supplied to the another recording device. As a result, as in the above-mentioned signal generating apparatus, the reproduction clock can be obtained, relatively easily and preferably, upon the reproduction, on the basis of the recorded record signals.

Consequently, according to the recording apparatus of the present invention, it is possible to preferably generate the reproduction clock used in the data reproduction or the like.

In one aspect of the recording apparatus of the present invention, the signal generating device generates each of the plurality of record signals such that a reversed edge appears on a waveform of at least one of the plurality of record signals in every time unit synchronized with the record clock.

According to this aspect, as detailed later, the cycle, in which the reversed edges appear, directly becomes the cycle of the second clock. Thus, by sampling the reversed edges, it is possible to generate the reproduction clock, preferably and relatively easily.

In another aspect of the recording apparatus of the present invention, the signal generating device generates each of the plurality of record signals such that a length of a peak of a waveform of each of the plurality of record signals corresponds to an integral multiple of a cycle of the record clock and such that a signal change corresponding to the cycle of the record clock appears on a waveform of at least one of the plurality of record signals.

According to this aspect, it is possible to record the record signals in accordance with the length-modulation method, and as a result, the reproduction clock can be generated, preferably and relatively easily.

Incidentally, in a case of a conventional recording apparatus and reproducing apparatus complying with the length-modulation method, there is such a technical problem that it is impossible to recognize what multiple of the length of the reference clock the record signal recorded in accordance with the length-modulation method is if the scanning speed of the recording medium is changed. Thus, it has been necessary to record/reproduce the signals while the scanning speed of the medium is maintained. However, in this condition, in a case of a recording medium scanned by an x-y scanner or the like, the scanning speed of the medium cannot be kept constant on the periphery of the medium where acceleration and deceleration are performed. This leads to such a technical problem that the record signals cannot be recorded. Moreover, in order to read the record signals recoded in only one portion on the recording medium, like the periphery of the medium where acceleration and deceleration are performed, it is necessary to perform the scanning many times with probes or the like until the scanning speed of the medium is stabilized. Thus, there are also such technical problems that power consumption required for the probe operation increases and that probe wear is also accelerated. According to this aspect, however, even if the scanning speed of the medium is changed, the reference clock (i.e. the above-mentioned record clock, or a reproduction clock described later) can be obtained from the record signals reproduced in parallel. Therefore, in the case of the recording medium scanned by the x-y scanner or the like, it is possible to expand an area where the record signals can be recorded or reproduced. Moreover, it is no longer necessary to operate the probes needlessly many times. Thus, it is possible to reduce the power consumption required for the probe operation, and to prevent the probe wear.

In another aspect of the recording apparatus of the present invention, the signal generating device generates each of the plurality of record signals on the basis of at least one of a conversion table and a predetermined conversion pattern.

According to this aspect, by using the conversion table and the conversion pattern, it is possible to relatively easily generate such plurality of record signals that can preferably generate the reproduction clock.

In another aspect of the recording apparatus of the present invention, the plurality of recording devices includes at least three or more probes each of which records the record signals.

According to this aspect, it is possible to record such record signals that can preferably generate the reproduction clock by using each of the three or more probes. Particularly, as the number of the probes increases, the reversed edge tends to appear more frequently on the waveform of the at least one of the plurality of record signals reproduced in parallel in the predetermined cycle. By this, it is possible to record such record signals that can more preferably generate the reproduction clock.

The above object of the present invention can be also achieved by a recording method in a recording apparatus provided with: a plurality of recording devices each of which records corresponding record signal of a plurality of record signals in parallel and in synchronization with a record clock, the recording method provided with: a signal generating process of generating the plurality of record signals in association with the corresponding recording device such that a reproduction clock synchronized with the record clock can be generated on the basis of the plurality of record signals reproduced in parallel, if the plurality of record signals are reproduced in parallel; and a recording process of recording each of the generated record signals by using the corresponding recording device of the plurality of recording devices.

According to the recording method of the present invention, it is possible to receive the various benefits owned by the above-mentioned recording apparatus of the present invention.

Incidentally, in response to the various aspects of the above-mentioned recording apparatus of the present invention, the recording method of the present invention can also adopt various aspects.

(Reproducing Apparatus or Method)

The above object of the present invention can be also achieved by a first reproducing apparatus for reproducing the plurality of record signals recorded by the above-mentioned recording apparatus of the present invention (including its various aspects), the reproducing apparatus provided with: a plurality of reproducing devices, each of which reproduces the corresponding record signal of the plurality of the record signals in parallel; and a clock generating device for generating a reproduction clock synchronized with the record clock, on the basis of the plurality of record signals respectively reproduced in parallel.

According to the first reproducing apparatus of the present invention, by virtue of the operation of the plurality of reproducing devices, the plurality of record signals recorded by the above-mentioned recording apparatus of the present invention are read in parallel and reproduced in parallel from a recording-medium or the like. More specifically, out of the plurality of record signals, the record signals corresponding to the respective reproducing devices are reproduced by the respective reproducing devices.

Then, by virtue of the operation of the clock generating device, the reproduction clock is generated from the plurality of record signals reproduced in parallel. At this time, the plurality of record signals, as described above, are recorded such that the reproduction clock synchronized with the record clock can be generated from the reproduction result of the plurality of record signals if the plurality of record signals are reproduced in parallel. Therefore, the clock generating device can generate the reproduction clock, relatively easily and preferably, from the plurality of record signals reproduced in parallel. Moreover, by using the generated reproduction clock, the reproduction operation of reproducing the plurality of record signals are continued by the plurality of reproducing devices.

Consequently, according to the first reproducing apparatus of the present invention, it is possible to preferably generate the reproduction clock used in the data reproduction or the like.

In one aspect of the first reproducing apparatus of the present invention, the plurality of record signals are generated such that a reversed edge appears on a waveform of at least one of the plurality of record signals in every time unit synchronized with the record clock, and the clock generating device generates the reproduction clock by sampling the reversed edge which appears on the waveform of the at least one of the plurality of record signals.

According to this aspect, as detailed later, the cycle, in which the reversed edges appear, directly becomes the cycle of the second clock. Thus, by sampling the reversed edges, it is possible to generate the reproduction clock, preferably and relatively easily.

The above object of the present invention can be also achieved by a second reproducing apparatus provided with: a plurality of reproducing devices, each of which reproduces corresponding record signal of a plurality of record signals in parallel; and a clock generating device for generating a reproduction clock commonly used on the reproducing apparatus, on the basis of the plurality of record signals respectively reproduced in parallel.

According to the second reproducing apparatus of the present invention, by virtue of the operation of the plurality of reproducing devices, the plurality of record signals recorded in a recording medium or the like are read in parallel and reproduced in parallel from the recording medium or the like. More specifically, out of the plurality of record signals, the record signals corresponding to the respective reproducing devices are reproduced by the respective reproducing devices.

Then, by virtue of the operation of the clock generating device, the reproduction clock is generated from the plurality of record signals reproduced in parallel. Particularly in the second reproducing apparatus, as detailed later, the reproduction clock can be generated even if the record signals are not recorded by the above-mentioned recording apparatus of the present invention. Particularly, the second reproducing apparatus preferably has the relatively large number of the reproducing devices (e.g. probes descried later). Namely, as detailed later, if the record signals are reproduced by using the relatively large number of reproducing devices, the plurality of record signals can be in the same condition as such a condition that they are recorded so as to generate the reproduction clock synchronized with the record clock, from the reproduction result thereof if they are reproduced in parallel. Therefore, the clock generating device can generate the reproduction clock, relatively easily and preferably, from the plurality of record signals reproduced in parallel.

Consequently, according to the second reproducing apparatus of the present invention, it is possible to preferably generate the reproduction clock used in the data reproduction or the like.

In one aspect of the second reproducing of the present invention, the clock generating device generates the reproduction clock by sampling a reversed edge which appears on a waveform of at least one of the plurality of record signals.

According to this aspect, as detailed later, the cycle, in which the reversed edges appear, directly becomes the cycle of the second clock. Thus, by sampling the reversed edges, it is possible to generate the reproduction clock, preferably and relatively easily.

In another aspect of the first or second reproducing of the present invention, it is further provided with a delay amount detecting device for detecting a delay amount, which indicates a difference between reproduction timing when one of the plurality of record signals is reproduced by one of the plurality of reproducing devices, and reproduction timing when another one of the plurality of record signals is reproduced by another one of the plurality of reproducing devices, the clock generating device generating the reproduction clock in view of the detected delay amount.

For example, the relative inclination between the reproducing devices and the recording medium on which the plurality of record signals are recorded may cause a difference in the reproduction operation among the reproducing devices (more specifically, cause a delay or advance in terms of time or the like with respect to the waveform of the reproduced record signal) and may have an adverse effect on the generation of the reproduction clock. According to this aspect, however, the reproduction clock can be generated in view of such a shift as the delay amount. Thus, such an adverse effect can be preferably eliminated, which can result in the generation of the reproduction clock, preferably.

In another aspect of the first or second reproducing of the present invention, the reproducing devices reproduce the respective record signals, on the basis of at least one of a conversion table and a predetermined conversion pattern.

According to this aspect, by using the conversion table and the conversion pattern, it is possible to generate the reproduction clock from plurality of record signals,.preferably and relatively easily.

In another aspect of the first or second reproducing of the present invention, the plurality of reproducing devices include at least three or more probes each of which reproduces the record signal.

According to this aspect, it is possible to preferably generate the reproduction clock from the record signals reproduced by the three or more probes. Particularly, as the number of the probes increases, the reversed edge tends to appear more frequently on the waveform of the at least one of the plurality of record signals reproduced in parallel in the predetermined cycle By this, it is possible to generate the reproduction clock, more preferably.

The above object of the present invention can be also achieved by a first reproducing method of reproducing the plurality of record signals recorded by the above-mentioned recording apparatus of the present invention (including its various aspects), the reproducing method provided with: a plurality of reproducing processes, each of which reproduces the corresponding record signal of the plurality of the record signals in parallel; and a clock generating process of generating a reproduction clock synchronized with the record clock, on the basis of the plurality of record signals respectively reproduced in parallel.

According to the first reproducing method of the present invention, it is possible to receive the various benefits owned by the above-mentioned first reproducing apparatus of the present invention.

Incidentally, in response to the various aspects of the above-mentioned first reproducing apparatus of the present invention, the first reproducing method of the present invention can also adopt various aspects.

The above object of the present invention can be also achieved by a second reproducing method provided with: a plurality of reproducing processes, each of which reproduces corresponding record signal of a plurality of record signals in parallel; and a clock generating process of generating a reproduction clock commonly used on the reproducing apparatus, on the basis of the plurality of record signals respectively reproduced in parallel.

According to the second reproducing method of the present invention, it is possible to receive the various benefits owned by the above-mentioned second reproducing apparatus of the present invention.

Incidentally; in response to the various aspects of the above-mentioned second reproducing apparatus of the present invention, the second reproducing method of the present invention can also adopt various aspects.

(Recording/Reproducing Apparatus or Method)

The above object of the present invention can be also achieved by a recording/reproducing apparatus provided with; a plurality of recording devices, each of which records corresponding record signal of a plurality of record signals in parallel and in synchronization with a record clock; a signal generating device for generating the plurality of record signals in association with the corresponding recording device such that a reproduction clock synchronized with the record clock can be generated on the basis of the plurality of record signals reproduced in parallel, if the plurality of record signals are reproduced in parallel; a plurality of reproducing devices, each of which reproduces the corresponding record signal of the plurality of the record signals in parallel; and a clock generating device for generating a reproduction clock synchronized with the record clock, on the basis of the plurality of record signals respectively reproduced in parallel.

According to the recording/reproducing apparatus of the present invention, it is possible to record the record signals (data) or reproduce the record signals (data) while taking advantage of the various benefits owned by each of the above-mentioned recording apparatus and reproducing apparatus of the present invention.

Incidentally, in response to the various aspects of each of the above-mentioned recording apparatus and reproducing apparatus of the present invention, the recording/reproducing apparatus of the present invention can also adopt various aspects.

The above object of the present invention can be also achieved by a recording/reproducing method provided with: a plurality of recording processes, each of which records corresponding record signal of a plurality of record signals in parallel and in synchronization with a record clock; a signal generating process of generating each of the plurality of record signals in association with the corresponding recording device such that a reproduction clock synchronized with the record clock can be generated on the basis of the plurality of record signals reproduced in parallel, if the plurality of record signals are reproduced in parallel; a plurality of reproducing processes, each of which reproduces the corresponding record signal of the plurality of the record signals in parallel; and a clock generating process of generating a reproduction clock synchronized with the record clock, on the basis of the plurality of record signals respectively reproduced in parallel.

According to the recording/reproducing method of the present invention, it is possible to receive the various benefits owned by the above-mentioned recording/reproducing apparatus of the present invention.

Incidentally, in response to the various aspects of the above-mentioned recording I reproducing apparatus of the present invention, the recording/reproducing method of the present invention can also adopt various aspects.

(Computer Program)

The above object of the present invention can be also achieved by a first computer program for signal generation control to control a computer provided in the above-mentioned signal generating apparatus of the present invention (including its various aspects), to make the computer function as at least one portion of the obtaining device and the signal generating device. The above object of the present invention can be also achieved by a second computer program for recording control to control a computer provided in the above-mentioned recording apparatus of the present invention (including its various aspects), to make the computer function as at least one portion of the signal generating device and the supplying device. The above object of the present invention can be also achieved by a third computer program for reproduction control to control a computer provided in the above-mentioned reproducing apparatus of the present invention (including its various aspects), to make the computer function as at least one portion of the clock generating device. The above object of the present invention can be also achieved by a fourth computer program for recording/reproduction control to control a computer provided in the above-mentioned recording/reproducing apparatus of the present invention (including its various aspects), to make the computer function as at least one portion of the signal generating device and the clock generating device.

According to each of the computer programs of the present invention, the above-mentioned signal generating apparatus, recording apparatus, reproducing apparatus, or recording/reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned signal generating apparatus, recording apparatus, reproducing apparatus, or recording I reproducing apparatus of the present invention, each of the computer programs of the present invention can adopt various aspects.

The above object of the present invention can be also achieved by a first computer program product in a computer-readable medium for tangibly embodying a program of instructions executable by a computer provided in the above-mentioned signal generating apparatus of the present invention (including its various aspects), to make the computer function as at least one portion of the obtaining device and the signal generating device. The above object of the present invention can be also achieved by a second computer program product in a computer-readable medium for tangibly embodying a program of instructions executable by a computer provided in the above-mentioned recording apparatus of the present invention (including its various aspects), to make the computer function as at least one portion of the signal generating device and the supplying device. The above object of the present invention can be also achieved by a third computer program product in a computer-readable medium for tangibly embodying a program of instructions executable by a computer provided in the above-mentioned reproducing apparatus of the present invention (including its various aspects), to make the computer function as at least one portion of the clock generating device. The above object of the present invention can be also achieved by a fourth computer program product in a computer-readable medium for tangibly embodying a program of instructions executable by a computer provided in the above-mentioned recording/reproducing apparatus of the present invention (including its various aspects), to make the computer function as at least one portion of the signal generating device and the clock generating device.

According to each of the computer program products of the present invention, the above-mentioned signal generating apparatus, recording apparatus, reproducing apparatus, or recording/reproducing apparatus of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned signal generating apparatus, recording apparatus, reproducing apparatus, or recording/reproducing apparatus of the present invention.

(Recording Medium)

The above object of the present invention can be also achieved by a recording medium on which a plurality of signals, each of which is outputted to corresponding output destination of a plurality of output destinations are recorded in synchronization with a first clock, wherein the plurality of signals are recorded such that a second clock synchronized with the first clock can be generated on the basis of the plurality of signals reproduced in parallel, if the plurality of signals are reproduced in parallel.

According to the recording medium of the present invention, the signals generated by the above-mentioned signal generating apparatus (or the record signals generated by the above-mentioned recording apparatus of the present invention) are recorded. Therefore, as in the above-mentioned signal generating apparatus of the present invention, the second clock (or the reproduction clock) can be preferably generated.

Incidentally, in response to the various aspects of the above-mentioned signal generating apparatus or recording apparatus, or the like of the present invention, the recording medium of the present invention can adopt various aspects.

These effects and other advantages of the present invention will become more apparent from the following embodiments.

As explained above, according to the signal generating apparatus of the present invention, it is provided with the obtaining device and the signal generating device, and according to the signal generating method of the present invention, it is provided with the obtaining process and the signal generating process. Therefore, the predetermined clock (e.g. the reproduction clock) can be preferably obtained from the generated signals.

Moreover, according to the recording apparatus of the present invention, it is provided with the recording device and the signal generating device and the supplying device, and according to the recording method of the present invention, it is provided with the signal generating process and the supplying process Therefore, it is possible to receive the various benefits owned by the signal generating apparatus of the present invention, and it is possible to record data into a recording medium. Moreover, according to the reproducing apparatus of the present invention, it is provided with the reproducing device and the clock generating device, and according to the reproducing method of the present invention, it is provided with the reproducing process and the clock generating process. Therefore, it is possible to receive the various benefits owned by the signal generating apparatus of the present invention, and it is possible to reproduce the data recorded in the recording medium.

BRIEF DESCRIPTION OF DRAWINGS

FIG. 1 is a block diagram conceptually showing the basic structure of an embodiment of the recording/reproducing apparatus of the present invention.

FIGS. 2A and 2B are a plan view and cross sectional view, respectively, conceptually showing one example of a dielectric recording medium used in the embodiment.

FIG. 3 is a cross sectional view conceptually showing a data recording operation performed by the recording/reproducing apparatus in the embodiment.

FIG. 4 is a block diagram conceptually showing the inner structure of a record processing circuit provided for the recording/reproducing apparatus in the embodiment.

FIG. 5 is an explanatory diagram showing waveforms of record signals generated correspondingly to respective probes provided for the recording/reproducing apparatus in the embodiment.

FIG. 6 is an explanatory diagram conceptually showing a specific process flow when the record signal is generated on the recording/reproducing apparatus in the embodiment.

FIG. 7 is a cross sectional view conceptually showing a data reproduction operation performed by the recording/reproducing apparatus in the embodiment.

FIG. 8 is a block diagram conceptually showing the inner structure of a reproduction processing circuit provided for the recording/reproducing apparatus in the embodiment.

FIG. 9 is an explanatory diagram showing waveforms of detection signals detected by respective signal detectors provided for the recording/reproducing apparatus in the embodiment, and a reproduction clock generated by the detection signals.

FIG. 10 is a block diagram conceptually showing the inner structure of a reproduction processing circuit provided for a recording/reproducing apparatus in a modified example.

FIG. 11 is an explanatory diagram showing waveforms of detection signals detected by respective signal detectors provided for the recording/reproducing apparatus in the modified example, and a reproduction clock generated by the detection signals.

DESCRIPTION OF REFERENCE CODES 100 recording/reproducing apparatus
110 recording/reproducing head
112a to 112c alternating current signal generator
113a to 113e switch
116 inductor
117 oscillator
118 FM demodulator
119a to 119e signal detector
131a to 131e probe
132 return electrode
140 record processing circuit
141 record clock generator
143 record signal generator
150 reproduction processing circuit
151a to 151e amplifier
152a to 152e binary circuit
154 reproduction clock generator
155 delay amount calculator
200 dielectric recording medium
216 electrode
217 dielectric material
WS1 to WS5 record signal
RS1 to RW5 detection signal

DETAILED DESCRIPTION OF EXAMPLE EMBODIMENTS

Hereinafter, a best mode for carrying out the present invention will be explained for each embodiment in order with reference to the drawings.

Hereinafter, an embodiment related to the signal generating apparatus and the like of the present invention will be explained on the basis of the drawings. Incidentally, in the following embodiment, the embodiment of a recording/reproducing apparatus which can include a signal generating apparatus, a recording apparatus, and a reproducing apparatus, will be explained.

(1) Basic Structure

Firstly, with reference to FIG. 1, the basic structure of a recording/reproducing apparatus 100 in this embodiment will be explained. FIG. 1 is a block diagram conceptually showing the basic structure of the recording/reproducing apparatus 100 in this embodiment. Incidentally, as shown in FIG. 1, the recording/reproducing apparatus 100 records data onto a dielectric recording medium 200 and reproduces the data recorded in the dielectric recording medium 200, and it adopts SNDM as a recording/reproducing method.

As shown in FIG. 1, the recording/reproducing apparatus 100 is provided with: a recording/reproducing head having a plurality of probes 131a to 131e, each of whose tips facing or opposed to a dielectric material 217 of the dielectric recording medium 200 and each for applying an electric field; a return electrode 132 for returning a high-frequency electric field for signal reproduction, applied from each of the probes 131a to 131e; an inductor 116 disposed between each of the probes 131a to 131e and the return electrode 132; an oscillator 117 which oscillates at a resonance frequency determined from the inductor 116 and a capacitance Cs of a portion which is polarized in accordance with recorded data and which is formed in the dielectric material 217 under each of the probes 131a to 131e; a plurality of alternating current (AC) signal generators 112a to 112e, each for applying an alternating electric field (AC signal) to detect the state of the polarization recorded in the dielectric material 217; a record processing circuit 140 which generates signals for recording the polarization state into the dielectric material 217; a plurality of switches 113a to 113e for changing outputs of the AC signal generators 112a to 112e and the record processing circuit 140; a plurality of inductors 114a to 114e; a plurality of condensers 115a to 115e; a FM demodulator 118 for demodulating FM signals modulated by the capacitance Cs corresponding to the polarization state owned by the dielectric material 217 under each of the probe 131a to 131e; a plurality of signal detectors 119a to 119e for detecting data from the demodulated signal; and a reproduction processing circuit 150 for reproducing the data detected on the signal detectors 119a to 119e.

The recoding/reproducing head 110 is provided with the five probes 131a to 131e, which constitute one specific example of the "recording device" and the "reproducing device" of the present invention. Then, each of the five probes 131a to 131e is connected to the oscillator 117 via a HPF (High Pass Filter) including respective one of the inductors 114a to 114e and respective one of the condensers 115a to 115e. Each of the five probes 131a to 131e is connected to respective one of the AC signal generators 112a to 112e and the record processing circuit 140, via the HPF and respective one of the switches 113a to 113e. For example, the probe 131a is connected to the oscillator 117 via the IPF including the corresponding inductor 114a and the corresponding condenser 115a, and is connected to the corresponding AC signal generator 112a and the record processing circuit 140 via the HPF and the corresponding switch 113a. Moreover, each of the five probes 131a to 131e functions as an electrode for applying an electric field to the dielectric material 217 of the dielectric recording medium 200.

Incidentally, the recording/reproducing head 110 having the five probes is used in the embodiment, but the number of the probes is not limited to this, and at least two or more probes are only necessary. More preferably, the recording/reproducing head 110 is provided with three or more probes, and it may be, for example, the recording/reproducing head 110 with each probe arranged such that 3×3, 8×8, or 32×32 probes are distributed in a matrix shape.

Moreover, since the recording/reproducing head 110 has the five probes 131a to 131e, the AC signal generators 112a to 112e, the switches 113a to 113e, the first inductors 114a to 141e, the condensers 115a to 115e, and the signal detectors 119a to 119e are provided by five. If the number of the probes changes, the number of these constituent elements also changes. Incidentally, the inductors and the condensers may be constructed with self-inductance or capacitance of the recording/reproducing head 110, not particularly using any parts.

The return electrode 132 is an electrode for returning the high-frequency electric field applied to the dielectric material 217 from each of the probes 131a to 131e i.e. a resonance electric field from the oscillator 117), and is located to surround the probes 131a to 131e. Incidentally, the shape and placement of the return electrode 132 can be arbitrarily set as long as the high-frequency electric field returns to the return electrode 132 without resistance.

The inductor 116 is located between each of the probes 131a to 131e and the return electrode 132, and may be formed from, e.g., a microstripline. A resonance circuit is constructed including the inductor 116 and the capacitance Cs. The inductance L of the inductor 116 is determined such that this resonance frequency is centered on approximately 1 GHz, for example.

The oscillator 117 is an oscillator which oscillates at the resonance frequency determined from the inductor 116 and the capacitance Cs. The oscillation frequency varies, depending on the change of the capacitance Cs. Therefore, FM modulation is performed correspondingly to the change of the capacitance Cs determined by a polarization domain corresponding to the recorded data. By demodulating this FM-modulated FM signal, it is possible to read the data recorded in the dielectric recording medium 200.

Incidentally, as detailed later, the resonance circuit is constructed from each of the probes 131a to 131e, the return electrode 132, the oscillator 117, the inductor 117, the HPF which includes the inductors 114a to 114e and the condensers 115a to 115e, and the capacitance Cs in the dielectric material 217. The FM signal amplified on the oscillator 117 is outputted to the FM demodulator 118.

Each of the AC signal generators 112a to 112e applies an alternating electric field between an electrode 216 of the dielectric recording medium 200 and each of the probes 113a to 113e. Moreover, in case of the recording/reproducing apparatus provided with the plurality of probes like the recording/reproducing apparatus 100 in the embodiment, the frequencies of the alternating electric fields are used as reference signals for synchronization on the signal detectors 119a to 119e, to thereby distinguish signals detected with the respective probes 131a to 131e. The frequencies are centered on about 5 kHz. In that condition, the alternating electric fields are applied to the micro domains of the dielectric material 217.

The record processing circuit 140 generates record signals WS1 to WS6 for recording, and supplies the record signals WS1 to WS5 to the respective probes 131a to 131e upon recording. The record signals WS1 to WS5 are not necessarily digital signals, but may be analog signals. Various signals, such as audio information, video information, and digital data for computers, are included as the record signals WS1 to WS5.

Particularly in the embodiment, the record signals WS1 to WS5 are generated on the record processing circuit 140 such that a reproduction clock can be preferably generated by reproducing the data, which is recorded on the basis of the respective record signals WS1 to WS5, by the plurality of probes 131a to 131e. The structure of the record processing circuit 140 and its detailed operation principle will be detailed later (refer to FIG. 4 etc.), The switches 113a to 113e select their outputs so as to supply the signals from the AC signal generators 112a to 112e upon reproduction, and the record signals WS1 to WS5 from the record processing circuit 140 upon recording, to the corresponding probes 131a to 131e, respectively. For example, the switch 113a selects its output so as to supply the signal from the AC signal generator 112a upon reproduction, and the record signal WS1 from the record processing circuit 140 upon recording, to the corresponding probe 131a. Each of the switches 113a to 113e uses a mechanical relay and a semiconductor circuit, but it is preferably constructed of the relay for analog signals, and the semiconductor circuit for digital signals.

The plurality of inductors 114a to 114e and the plurality of condensers 115a to 115e constitute the HPFs for the corresponding probes 131a to 131e, respectively. For example, the inductor 114a and the condenser 115a constitute the HPF for the probe 131a. For example, the inductor 114c and the condenser 115c constitute the HPF for the probe 131c. The HPFs are used to cut off signal lines such that the alternating electric fields from the AC signal generators 112a to 112e and the record signals WS1 to WS5 from the record processing circuit 140 do not interfere with the oscillation of the oscillator 117. The cutoff frequency f is given by $f = 1/2\pi\sqrt{LC}$, wherein L denotes the inductance of the inductors 114a to 114e and C denotes the capacitance of the condensers 115a to 115e. Now, since the frequency of each of the alternating electric fields supplied from the AC signal generators 112a to 112e is approximately 5 KHz and the oscillation frequency of the oscillator 117 is approximately 1 GHz, the both frequencies can be sufficiently separated by a first-order LC filter. A higher-order filter may be used, but it causes the number of elements to be increased, so that there is a possibility that the apparatus becomes bigger.

The FM demodulator 118 demodulates the oscillation frequency of the oscillator 117, which is FM-modulated due to the small change of the capacitance Cs, and reconstructs a waveform corresponding to the polarized state of a portion which is traced by each of the probes 131a to 131e. If the recorded data are digital data of "0" and "1", there are two types of frequencies to be demodulated. By distinguishing the frequencies, the data reproduction is easily performed.

The signal detectors 119a to 119e detect detection signals RS1 to RS5 from the signals demodulated on the FM demodulator 118, respectively, wherein the detection signals RS1 to RS5 indicate nonlinear dielectric components whose signs are reversed depending on the polarization states of the dielectric material 217 of the portions facing the tip portions of the respective probes 131a to 131e. At this time, the alternating electric fields outputted from the corresponding AC signal generators 112a to 112e is supplied to the signal detectors 119a to 119e. In detecting the detection signals RS1 to RS5, the alternating electric fields (specifically, frequencies and angular frequencies of the alternating electric fields, etc.) are used as reference signals. For example, lock-in amplifiers are used as the signal detectors 119a to 119e, and coherent detection or synchronized detection is performed on the basis of the frequencies of the alternating electric fields of the AC signal generators 112a to 112e, to thereby detect the detection signals RS1 to RS5. Incidentally, it is obvious that another phase detection device may be used. Then, the detected detection signals RS1 to RS5 are outputted to the reproduction processing circuit 150.

The reproduction processing circuit 150 reproduces the data recorded in the dielectric recording medium 200, from the detection signals RS1 to TS5 detected by the signal detectors 119a to 119e. Particularly in the embodiment, the reproduction processing circuit 150 generates the reproduction clock as a reference in reproducing the data by using the detection signals RS1 to RS5. The structure of the reproduction processing circuit 150 and its detailed operation principle will be detailed (refer to FIG. 8, etc.).

Incidentally, out of the recording/reproducing apparatus 100, mainly, the record processing circuit 140, the switches 113a to 113e, and the recording/reproducing head 110 constitute a recording system (i.e. one specific example of the "recording apparatus" of the present invention), while mainly the reproduction processing circuit 150, the AC signal generators 112a to 112e, the switches 113a to 113e, the recording/reproducing head 110, the inductor 116, the oscillator 117, the FM demodulator 118, and the signal detectors 119a to 119e constitute a reproduction system (i.e. one specific example of the "reproducing apparatus" of the present invention).

Next, one example of the dielectric recording medium used for the data recording and reproduction performed by the recording/reproducing apparatus in the embodiment will be explained with reference to FIGS. 2. FIGS. 2 are a plan view and cross sectional view conceptually showing one example of the dielectric recording medium 200 used in the embodiment.

AS shown in FIG. 2(a), the dielectric recording medium 200 is a disc-shaped dielectric recording medium, and is provided with: a center hole 210; and an inner area 207, a recording area 208, and an outer area 209, which are located concentrically from the center hole 210 in this order. The center hole 210 is used when the dielectric recording medium 200 is mounted on a spindle motor or in a similar case.

The recording area 208 is an area to record the data therein and has tracks and spaces between the tracks. Moreover, for the tracks and the spaces, there is provided an area to record therein control information associated with the record and reproduction. Furthermore, the inner area 207 and the outer area 209 are used to recognize the inner position and the outer position of the dielectric recording medium 200, respectively, and can be used as areas to record therein information about the data to be recorded, such as a title, its address, a recording time length, and a recording capacity. Incidentally, the above-described structure is one example of the dielectric recording medium 200, and another structure, such as a card-shape, can be also adopted.

Moreover, as shown in FIG. 2(b), the dielectric recording medium 200 is formed such that the electrode 216 is laminated on a substrate 215 and that the dielectric material 217 is laminated on the electrode 216.

The substrate 215 is Si (silicon), for example, which is a preferable material in its strength, chemical stability, workability, or the like. The electrode 216 is intended to generate an electric field between the electrode 216 and each of the probes 131a to 131e (or the return electrode 132). By applying such an electric field to the dielectric material 217 that is equal to or stronger than the coercive electric field of the dielectric material 217, the polarization direction is determined. By determining the polarization direction in accordance with the data, the recording is performed.

The dielectric material 217 is formed by a known technology, such as spattering $LiTaO_3$ or the like, which is a ferroelectric substance, onto the electrode 216. Then, the recording is performed with respect to the Z surface of $LiTaO_3$ in which the plus and minus surfaces of the polarization have a 180-degree domain relationship. It is obvious that another dielectric material may be used. In the dielectric material 217, the small polarization is formed at high speed, by a voltage for data, which is applied simultaneously with a direct current bias voltage.

Moreover, as the shape of the dielectric recoding medium 200, for example, there are a disc shape and a card shape and the like. The displacement of the relative position with respect to each of the probes 131a to 131e is performed by the rotation of the medium, or by displacing either each of the probes 131a to 131e or the medium linearly (e.g. on two axes of an X axis a Y axis).

(2) Recording Operation

Next, with reference to FIG. 3 to FIG. 6, the recording operation of the recording/reproducing apparatus 100 in the embodiment will be explained.

Firstly, with reference to FIG. 3, the basic principle of the recording operation will be explained. FIG. 3 is a cross sectional view conceptually showing the data recording operation.

As shown in FIG. 3, by applying such an electric field that is equal to or stronger than the coercive electric field of the dielectric material 217 between the electrode 216 and each of the probes 131a to 131e, the dielectric material 217 is polarized having a direction corresponding to the direction of the applied electric field. Then, by controlling an applying voltage to thereby change the polarization direction, it is possible to record predetermined data. This uses such a characteristic that if an electric field which exceeds the coercive electric field of a dielectric substance is applied to the dielectric substance (particularly, a ferroelectric substance), the polarization direction is reversed, and that the polarization direction is maintained.

More specifically explaining this, the record processing circuit 140 generates the record signals (pulse signals) WS1 to WS5 corresponding to the data to be recorded. In recording the data into the dielectric recording medium 200, the switch 113a is shifted so as to connect the record processing circuit 140 and the inductor 114a. By this, the record signal outputted from the record processing circuit 140 is supplied to the probe 131a of the recording/reproducing head 110 via the switch 113a and the inductor 114a, and is applied to the dielectric material 217 of the dielectric recording medium 200. By this, the polarization state of the dielectric material 217 of a portion which faces the tip portion of the probe 131a is set in accordance with the record signal WS1. Of course, the same operation is also performed on the other probes 131b to 131e. As described above, when the record signals WS1 to WS5 are applied, the dielectric recording medium 200 is rotated by the driving of a not-illustrated spindle motor or the like, and the recording/reproducing head 110 is displaced in the radial direction of the dielectric recording medium 200, under the control of a not-illustrated servo-control apparatus. By this, the data is recorded into the dielectric recording medium 200, as the polarization state of the dielectric material 217.

For example, it is assumed that the micro domain has downward polarization P by applying an electric field which directs from the each of the probes 131a to 131e to the electrode 216, and that the micro domain has upward polarization P by applying an electric field which directs from the electrode 216 to each of the probes 131a to 131e. This corresponds to the state that the data information is recorded. If the recording/reproducing head 110 including the probes 131a to 131e is operated in an arrow-pointing direction, a detection voltage is outputted as a square wave which swings up and down in accordance with the polarization P. Incidentally, this level changes depending on the polarization extent of the polarization P, and can be recorded as an analog signal.

Next, the record processing circuit 140 in the embodiment and the record signals generated by the record processing circuit 140 will be explained in more detail, with reference to FIG. 4 to FIG. 6. FIG. 4 is a block diagram conceptually showing the inner structure of the record processing circuit 140. FIG. 5 is an explanatory diagram showing waveforms of record signals generated correspondingly to respective probes 131a to 131e. FIG. 6 is an explanatory diagram conceptually showing a specific process flow when the record signal is generated. Incidentally, the record processing circuit 140 constitutes one specific example of the "signal generating apparatus" of the present invention.

As shown in FIG. 4, the record processing circuit 140 is provided with: a record clock generator 141; a record data source 142; and a record signal generator 143.

The record clock generator 141 generates a record clock as a reference in generating the record signals WS1 to WS5.

The record data source 142 constitutes one specific example of the "obtaining device" of the present invention, and stores therein various data to be recorded into the dielectric recording medium 200 (e.g. video content data and music content data, such as a movie and a TV program, or data for PC, etc.). Moreover, the record data source 142 is constructed to output the stored various data to the record signal generator 143. Alternatively, the record data source 142 may be constructed to receive the various data via networks or via ground waves and satellite waves, and to output the received data to the record signal generator 143.

The record signal generator 143 constitutes one specific example of the "signal generating device" of the present invention, and generates the record signals WS1 to WS5 corresponding to the respective probes 131*a* to 131*e*, on the basis of the original data outputted from the record data source 142. Namely, the record signal generator 143 performs a time-sharing process or the like with respect to the original data to be recorded into the dielectric recording medium 200 (or its binary data), to thereby generate the plurality of record signals WS1 to WS5.

At this time, the record signal generator 143 generates the record signals WS1 to WS5 such that at least one of the pulse waveforms of the record signals WS1 to WS5 is reversed (or such that at least one of the record signals has a reversed edge portion) in every cycle of the record clock generated by the record clock generator 141. In other words, the record signal generator 143 generates the record signals WS1 to WS5 such that at least one of the pulse waveforms of the record signals WS1 to WS5 is reversed in the same cycle as the cycle in which the record clock reverses.

Specifically, as shown in FIG. 5, at least one of the pulse waveforms of the record signals WS1 to WS5 is reversed in accordance with the portion where the pulse waveform of the record clock is reversed (the reversed edge portion). For example, in the portion where the pulse waveform of the record clock is firstly reversed shown in FIG. 5 (the portion denoted by (a) in FIG. 5), each of the pulse waveforms of the record signals WS1 and WS4 is reversed. Then, in the portion where the pulse waveform of the record clock is reversed next shown in FIG. 5 (the portion denoted by (b) in FIG. 5), the pulse waveform of the record signal WS2 is reversed. Then, in the portion where the pulse waveform of the record clock is reversed next shown in FIG. 5 (the portion denoted by (c) in FIG. 5), each of the pulse waveforms of the record signals WS3 and WS4 is reversed. For example, in the portion where the pulse waveform of the record clock is reversed next shown in FIG. 5 (the portion denoted by (d) in FIG. 5), each of the pulse waveforms of the record signals WS1 and WS5 is reversed. The same holds true for the subsequent portions where the pulse waveform of the record clock is reversed.

The record signals WS1 to WS5 can be generated by performing length-modulation, such as 1-7 modulation, EFM modulation (Eight to Fourteen Modulation), and 8-16 modulation, with respect to the original data to be recorded. Namely, the record signals WS1 to WS5 can be generated by combining the pulse waveforms whose cycles are integral multiples of the cycle of the record clock.

Moreover, by only performing the above length-modulation with respect to the original data to be recorded, there is a possibility that all pulse waveforms of the record signals WS1 to WS5 does not reversed in the portions where the pulse waveform of the record clock is reversed. In this case, special modulation may be performed with respect to portions where no pulse waveforms of the record signals WS1 to WS5 are reversed so that at least one pulse waveform is reversed. For example, 8-16 modulation in which the record signals WS1 to WS5 are generated by converting 8-bit data to 16-bit data is taken as an example. In this example, a plurality of patterns for converting to the 16-bit data are prepared, and the pattern which allows at least one of the pulse waveforms of the record signals WS1 to WS5 to reverse in the portion where the pulse waveform of the record clock is reversed is selected. The type of the selected pattern does not cause any particular problem even upon the data reproduction if it is included in the record signals WS1 to WS5 (or the header portions and sync block portions thereof). By virtue of such construction, the record signals WS1 to WS5 can be generated such that at least one of the pulse waveforms of the record signals WS1 to WS5 is reversed in the portion where the pulse waveform of the record clock is reversed.

On the basis of the record signals WS1 to WS5, voltages applied from the respective probes 131*a* to 131*e* to the dielectric recording medium 200 are changed, to thereby change the polarization states on the micro domains of the dielectric material 217. Then, the polarization states are read by using the plurality of probes 131*a* to 131*e*, as described later. By this, the reproduction clock can be preferably generated (or obtained), as described later. The generation operation of generating the reproduction clock will be detailed later.

Incidentally, instead of by selecting the modulation pattern described above, as shown in FIG. 6, by performing data-conversion with respect to the original data to be recorded with a predetermined table, the record signals WS1 to WS5 may be generated such that at least one of the pulse waveforms of the record signals WS1 to WS5 is reversed in the portion where the pulse waveform of the record clock is reversed (or in every predetermined cycle).

For example, as shown in FIG. 6, three tables A, B, and C may be prepared for the conversion of the original data to be recorded. At this time, if the original data is converted on the basis of the table A, as shown in an upper pulse waveform diagram in FIG. 6, there are portions where no pulse waveforms of the record signals WS1 to WS5 are reversed, as surrounded by circles, in accordance with the predetermined cycle. In the same manner, if the original data is converted on the basis of the table B, as shown in a middle pulse waveform diagram in FIG. 6, there is a portion where no pulse waveforms of the record signals WS1 to WS5 are reversed, as surrounded by a circle, in accordance with the predetermined cycle. On the other hand, if the original data is converted on the basis of the table C, as shown in a lower pulse waveform diagram in FIG. 6, at least one of the pulse waveforms of the record signals WS1 to WS5 is reversed in accordance with the predetermined cycle. Therefore, in this case, the table C is selected to convert the original data. If the type of the selected table is included in the record signals WS1 to WS5 (or the header portions and sync block portions thereof), then there is no particular problem even upon the data reproduction.

Moreover, if the original data to be recorded is converted by using such a table, it is not necessary to perform the length-modulation according to the cycle of the record clock, as described above. Namely, by using the table, the record signals WS1 to WS5 can be directly generated (or obtained) so that at least one pulse waveform is reversed in every predetermined cycle. That is why the length-modulation is not necessarily performed.

Incidentally, as shown in FIG. 5, it is not necessary to generate the record signals WS1 to WS5 such that at least one pulse waveform is reversed on a record time axis. For example, the record signals WS1 and WS2 in FIG. 5 (or the other record signals WS3 to WS5) are not necessarily generated or recorded in the timing shown in FIG. 5, on the record time axis. The point is that as long as the reproduction clock can be obtained from the data reproduced at the same time or in parallel by using the probes 131*a* to 131*e* in reproducing the record data, as described later, the record signals WS1 to WS5 may be generated or recorded in any timing. More specifically, as detailed later (refer to FIG. 9), it is only necessary to generate and record the record signals WS1 to WS5 for recording such data that at least one of the pulse waveforms of the detection signals RS1 to RS5 detected at the same time or in parallel is reversed in every predetermined cycle on a reproduction time axis.

(3) Reproduction Operation

Next, with reference to FIG. 7 to FIG. 11, the reproduction operation of the recording/reproducing apparatus 100 in the embodiment will be explained.

Firstly, with reference to FIG. 7, the reproduction operation of the recording/reproducing apparatus 100 will be explained. FIG. 7 is a cross sectional view conceptually showing the data reproduction operation.

The nonlinear dielectric constant of the dielectric substance changes in association with the polarization direction of the dielectric substance. Then, the nonlinear dielectric constant of the dielectric substance can be detected as a difference in the capacitance of the dielectric substance or a difference in change of the capacitance, when an electric field is applied to the dielectric substance. Therefore, by applying an electric field to the dielectric material and detecting a difference in the capacitance Cs in a particular micro domain of the dielectric material at that time or a difference in change of the capacitance Cs, it is possible to read and reproduce the data recorded as the polarization direction of the dielectric material.

Specifically, firstly, the switches 113a to 113e are shifted so as to connect the AC signal generators 112a to 112e with the corresponding inductors 114a to 114e, respectively. By this, the alternating electric fields generated by the AC signal generators 112a to 112e are supplied to the probes 131a to 131e of the recording/reproducing head 110 through the corresponding switches 113a to 113e and the corresponding inductors 114a to 114e, respectively. Then, as shown in FIG. 7, the alternating electric fields from the not-illustrated AC signal generators 112a to 112e are applied between the electrode 216 and the corresponding probes 131a to 131e, respectively. For example, the alternating electric field from the AC signal generator 112a is applied between the electrode 216 and the probe 131a. Alternatively, the alternating electric field from the AC signal generator 112c is applied between the electrode 216 and the probe 131c. The alternating electric fields have electric-field strengths to the extent that they do not exceed the coercive electric field of the dielectric material 217, and the alternating electric fields have, for example, a frequency of approximately 5 kHz. The alternating electric fields are generated mainly to distinguish the difference in change of the capacitance corresponding to the polarization direction of the dielectric material 217. Incidentally, instead of the alternating electric fields, direct current bias voltages may be applied to form electric fields in the dielectric material 217. When this alternating electric fields are applied, electric fields are generated in the dielectric material 217 of the dielectric recording medium 200.

Then, the recording/reproducing head 110 is put closer to a recording surface until the distance between the tip of each of the probes 131a to 131e and the recording surface becomes extremely small on the order of nanometers. Under this condition, the oscillator 117 is driven. Incidentally, in order to detect the capacitance Cs of the dielectric material 217 under each of the probes 131a to 131e highly accurately, it is preferable to contact each of the probes 131a to 131e with the surface of the dielectric material 217, i.e. the recording surface. However, even if the tip of each of the probes 131a to 131e is not contacted with the recording surface and is put closer to the recording surface to the extent that can be substantially regarded as the contact, for example, the reproduction operation (moreover, the above-mentioned recording operation) can be performed.

Then, the oscillator 117 oscillates at the resonance frequency of the resonance circuit, which includes the inductor 116 and the capacitance Cs of the dielectric material 217 under each of the probes 131a to 131e as the constituent elements. The center frequency of the resonance frequency is set to approximately 1 GHz, as described above.

Here, the return electrode 132 and each of the probes 131a to 131e constitute one portion of the oscillation circuit including the oscillator 117. The high-frequency signal of approximately 1 GHz, which is applied to the dielectric material 217 from each of the probes 131a to 131e, passes through the dielectric material 217 and returns to the return electrode 132, as shown by solid lines in FIG. 7 By disposing the return electrode 132 in the vicinity of each of the probes 131a to 131e and shortening a feedback route to the oscillation circuit including the oscillator 117, it is possible to reduce noise (e.g. a floating capacitance component) entering in the oscillation circuit.

In addition, the change of the capacitance Cs corresponding to the nonlinear dielectric constant of the dielectric material 217 is extremely small, and it is necessary to adopt a detection method having high detection accuracy in order to detect this change. In a detection method using FM modulation, the high detection accuracy can be generally obtained. But it is necessary to further improve the detection accuracy, in order to make it possible to detect the small capacitance change corresponding to the nonlinear dielectric constant of the dielectric material 217. Thus, in the recording/reproducing apparatus 100 in the embodiment (i.e. recording/reproducing apparatus which uses the SNDM principle), the return electrode 132 is located in the vicinity of each of the probes 131a to 131e to shorten the feedback route to the oscillation circuit as much as possible. By this, it is possible to eliminate an influence, such as a noise, and to obtain extremely high detection accuracy, and thus it is possible to detect the small capacitance change corresponding to the nonlinear dielectric constant of the dielectric substance.

After the oscillator 117 is driven, the recording/reproducing head 110 is displaced in parallel with the recording surface on the dielectric recording medium 200. Due to the displacement, the domain of the dielectric material 217 under each of the probes 131a to 131e is changed, and whenever the polarization direction thereof changes, the capacitance Cs changes. Namely, the capacitance Cs changes due to a nonlinear dielectric constant component, whose sign is reversed in accordance with the change of the polarization state of the dielectric material 217, in the portion which faces the tip of each of the probes 131a to 131e. If the capacitance Cs changes, the resonance frequency, i.e. the oscillation frequency of the oscillator 117, changes. As a result, the oscillator 117 outputs a signal which is FM-modulated on the basis of the change of the capacitance Cs.

This FM signal is frequency-voltage converted by the FM demodulator 118. As a result, the change of the capacitance Cs is converted to the extent of a voltage. The change of the capacitance Cs corresponds to the nonlinear dielectric constant component of the dielectric material 217. The nonlinear dielectric constant component corresponds to the polarization direction of the dielectric material 217. The polarization direction corresponds to the data recorded in the dielectric material 217. Therefore, a signal obtained from the demodulator 118 is a signal in which a voltage changes in accordance with the data recorded in the dielectric recording medium 200. Then, the detection signals RS1 to RS5 are detected by the signal detectors 119a to 119e, wherein the detection signals RS1 to RS5 include the nonlinear dielectric constant components, whose signs are reversed in accordance with the polarization states of the dielectric material 217, in the portions which face the tip portions of the respective probes 131a to 131e. To the signal detectors 119a to 119e, AC signals outputted from the corresponding AC signal generators 112a to 112e are supplied. The AC signals are used as reference signals to perform coherent detection or synchronized detection or the like, by which the detection signals RS1 to RS5 are detected. The detection signals RS1 to RS5 detected in this manner correspond to the polarization states of the dielectric material 217 in the portions which face the tip of the probes 131a to 131e, i.e. the data recorded in the dielectric material 217 in the portions, respectively.

The reproduction processing circuit 150 performs a process, such as combination, with respect to the detected detection signals RS1 to RS5, to thereby reproduce the data recorded in the dielectric recording medium. The reproduction operation is performed simultaneously with the rotation of the dielectric recording medium 200 and the displacement of the recording/reproducing head 110.

In addition, particularly in the embodiment, on the reproduction processing circuit 150, the reproduction clock is generated from the detection signals RS1 to RS5. This operation will be explained in more detail, with reference to FIG. 8 and FIG. 9. FIG. 8 is a block diagram conceptually showing the inner structure of the reproduction processing circuit 150. FIG. 9 is an explanatory diagram showing waveforms of detection signals detected by the respective signal detectors 119a to 119e and the reproduction clock generated by the detection signals.

As shown in FIG. 8, the reproduction processing circuit 150 is provided with: a plurality of amplifiers 151a to 151e; a plurality of binary circuits 152a to 152e; a parallel/serial conversion circuit 153; and a reproduction clock generator 154.

The amplifiers 151a to 151e convert the corresponding detection signals RS1 to RS5 to voltage signals and output them to the corresponding binary circuits 153a to 153e, respectively. For example, the amplifier 151a converts the corresponding detection signal RS1 to a voltage signal and outputs it to the corresponding binary circuit 153a. At this time, each of the amplifiers 151a to 151e may be constructed to amplify the converted voltage signal.

The binary circuits 152a to 152e convert the voltage signals converted by the corresponding amplifiers 151a to 151e to binary data rows denoted by "0 (LOW level)" and "1 (HIGH level)". At this time, the binary circuits 152a to 152e sample the converted voltage signals with reference to the reproduction clock outputted by the reproduction clock generator 154, to thereby convert to the binary data rows.

The parallel/serial conversion circuit 153 converts the binary data rows outputted in parallel from the binary circuits 152a to 152e, to the original data to be reproduced. Namely, the parallel/serial conversion circuit 153 converts parallel signals (binary data rows) outputted from the binary circuits 152a to 152e, to a serial signal (one original data). The original data to be reproduced is displayed by being outputted to various external output equipment, such as a display and a speaker. Alternatively, various data processes are performed with respect to the original data to be reproduced, by outputting it to a personal computer or the like.

The reproduction clock generator 154 constitutes one specific example of the "clock generating device" of the present invention, and generates the reproduction clock by binarizing the voltage signals converted by the amplifiers 151a to 151e.

The generation of the reproduction clock will be explained in more detail, with reference to FIG. 9.

As shown in FIG. 9, specifically, the reproduction clock is generated such that the pulse waveform of the reproduction clock is reversed in portions where at least one of the five pulse waveforms generated by binarizing the voltage signals converted by the amplifiers 151a to 151e (hereinafter, referred to as "reproduction pulse waveforms", as occasion demands) is reversed. For example, in FIG. 9, firstly, the reproduction pulse waveforms corresponding to the amplifiers 151a and 151d are reversed. Then, the reproduction pulse waveform corresponding to the amplifier 151b is reversed. Then, the reproduction pulse waveforms corresponding to the amplifiers 151c and 151d are reversed. Then, the reproduction pulse waveforms corresponding to the amplifiers 151a and 151e are reversed. On the reproduction clock generator 154, the reproduction clock (refer to the bottom of FIG. 9) is generated such that its pulse waveform is reversed in the same timing as that of reversing the reproduction pulse waveform.

At this time, one reproduction clock may be generated directly from the plurality of reproduction pulse waveforms (or the detection signals RS1 to RS5). For example, the reproduction clock shown in the bottom of FIG. 9 may be generated by sampling the timing of reversing the plurality of reproduction pulse waveforms shown in FIG. 9. Alternatively, after a plurality of clocks (five clocks in this case) are individually and respectively generated from the plurality of reproduction pulse waveforms, an averaging process or the like may be performed with respect to the five clocks, to thereby generate one reproduction clock, as shown in the bottom of FIG. 9, which is commonly used on the recording/reproducing apparatus 100. Namely, one reproduction clock may be generated indirectly.

Then, as explained in the above-mentioned recording operation, if the data is reproduced in parallel by the plurality of probes 131a to 131e, the data is recorded such that at least one of the reproduction pulse waveforms is reversed in every predetermined cycle, as shown in FIG. 9. Thus, it is possible to preferably generate the reproduction clock (refer to the bottom of FIG. 9) such that its pulse waveform is reversed in every predetermined cycle.

As explained above, according to the recording/reproducing apparatus 100 in the embodiment, the data reproduced in parallel by the plurality of probes 131a to 131e can be used to preferably generate the reproduction clock. In particular, with regard to the plurality of reproduction pulse waveforms corresponding to the data reproduced in parallel, at least one reproduction pulse waveform is reversed in predetermined timing. Thus, by sampling the timing of reversing the reproduction pulse waveform, the reproduction clock whose pulse waveform is reversed in predetermined timing (i.e. which has a predetermined cycle) can be reproduced, preferably and relatively easily.

Even if it is tried to generate the reproduction clock by using the data reproduced by a single probe, the reproduction pulse waveform corresponding to the reproduced data is not necessarily reversed in every predetermined timing, so that it is necessary to perform a predetermined process or the like based on the length-modulation method or the like to generate the reproduction clock. It is impossible to generate the reproduction clock only by sampling the timing of reversing the reproduction pulse waveform as in the embodiment. Moreover, as explained in Background Art, even if the reproduction clock is tried to be generated by using the plurality of reproduction pulse waveforms corresponding to the data reproduced by the plurality of probes, a common reproduction clock is generated with a cycle and a frequency which are independent and different from those of the clock individually obtained from the reproduction pulse waveforms in Background Art.

The embodiment, however, has such an aspect that the commonly used reproduction clock is generated on the basis of the reproduction pulse waveforms. Thus, it is significantly different from the above-mentioned Background Art configuration. Moreover, the reproduction pulse waveforms corresponding to the data reproduced in parallel are not independently treated, but they are treated integrally like one signal or in association with each others. Thus, by sampling the timing of reversing the reproduction pulse waveforms, it is possible to generate the reproduction clock, relatively easily.

Incidentally, as the number of the probes increases relatively, such a chance that at least one of the plurality of reproduction pulse waveforms corresponding to the plurality of probes is reversed in every predetermined timing increases. Namely, as the number of the reproduction pulse waveforms converted in parallel on the reproduction clock generator 134 increases, such a possibility that at least one of the plurality of reproduction pulse waveforms is reversed in every predetermined cycle significantly increases. Thus, if the number of the probes relatively increases (e.g. if the number is not less than 8×8, or 32×32), the situation that at least one of the reproduction pulse waveforms is reversed in every predetermined timing can be realized, even without the above-mentioned recording operation. Even in the case where there are portions where at least one of the plurality of reproduction pulse waveforms is not reversed in every predetermined timing because of not performing the above-mentioned recording operation, if the 0o number of the probes relatively increases, the portions can be reduced as many as possible or to a negligible extent. Therefore, since there is no particular influence (i.e. it is negligible) on the generation of the reproduction clock, as a result, there is such an advantage that the reproduction clock can be preferably generated.

Incidentally, the reproduction processing circuit 150 may be constructed in hardware by using a logic circuit, or may be constructed in software by using programming of a DSP (Digital Signal Processor), for example. However even in the case where the reproduction processing circuit 150 is constructed in software, the amplifiers 151a to 151e are preferably constructed in hardware.

Moreover, as described in the explanation of the recording operation, in the case where the modulation pattern is selected to generate the record signals, or the case where the predetermined table is selected to generate the record signals, the selected modulation pattern or table is preferably recognized when the above-mentioned reproduction operation (particularly the operation in the reproduction processing circuit 160) is performed.

(4) Modified Example of Reproduction Operation

Next, with reference to FIG. 10 and FIG. 11, the modified example of the reproduction operation of the recording/reproducing apparatus 100 in the embodiment will be explained. FIG. 10 is a block diagram conceptually showing the inner structure of a reproduction processing circuit 160 in the modified example. FIG. 11 is an explanatory diagram showing waveforms of detection signals detected by the respective signal detectors 119a to 119e and a reproduction clock generated by the detection signals. Incidentally, in the modified example, basically, there is no change in the structure of the recording/reproducing apparatus 100; however, the inner structure of the reproduction processing circuit and its operation are slightly changed.

During the reproduction operation of the reproduction processing circuit 100, the timing of reversing the reproduction pulse waveforms is sometimes shifted between at least two of the probes 131a to 131e. For example, although the timings of reversing the reproduction pulse waveforms corresponding to the respective probes 131a to 131d are uniformed (i.e. the reproduction pulse waveforms are reversed in synchronization with the predetermined timing), the timing of the reproduction pulse waveform of the probe 131e is shifted from the predetermined timing (i.e. the timings of reversing the reproduction pulse waveforms corresponding to the respective probes 131a to 131d). This likely occurs in the case where the recording/reproducing head 110 (specifically, each of the plurality of probes 131a to 131e) relatively leans to the dielectric recording medium 200. The shift of timing leads to an increase of jitter in reproducing the data or the like, and it is not preferable at all in terms of ensuring the preferable reproduction operation. In the modified example, it is possible to correct the shift in timing of reversing the reproduction pulse waveforms.

As shown in FIG. 10, the inner structure of the reproduction processing circuit 160 in the modified example is substantially the same as that of the above-mentioned reproduction processing circuit 150. The reproduction processing circuit 160 is provided particularly with a delay amount detector 155.

The delay amount detector 155 constitutes one specific example of the "delay amount detecting device" of the present invention, and it is constructed to detect the delay amount of the detection timing of a pre-format signal recorded in the dielectric recording medium 200 in advance, on the basis of the data which is binarized by the binary circuits 152a to 152e. The relative lean between the dielectric recording medium 200 and the recording/reproducing head 110 (specifically, each of the probes 131a to 131e) can be detected as a shift (or delay amount) of the detection timing of the pre-format signal. Therefore, the delay amount detector 155 detects the delay amount of the detection timing of the pre-format signal, to thereby indirectly detect the presence or absence (or degree) of the relative lean between the dielectric recording medium and the recording/reproducing head 110.

For example, as shown in FIG. 11, it is assumed that the reproduction pulse waveforms corresponding to the signal detector 119d (i.e. the probe 131d) and the signal detector 119e i.e. the probe 131e) are shifted, based on the reproduction pulse waveform corresponding to the signal detector 119a (.e. the probe 131a). The delay amount detector 155 detects the shifts of the detection timing of the pre-format signals corresponding to the signal detectors 119d and 119e, to thereby detect the shifts of the reproduction pulse waveforms corresponding to the signal detectors 119d and 119e.

Then, the shift is fed-back to the reproduction clock generator 154, and the reproduction clock generator 154 generates the reproduction clock in view of the shifts of the reproduction pulse waveforms corresponding to the signal detectors 119d and 119e. For example, the reproduction clock generator 154 generates reproduction pulse waveforms with no shift in a pseudo manner, by shifting the reproduction pulse waveforms corresponding to the signal detectors 119d and 119e by a time-length corresponding to the shifts (or by performing a predetermined operation or calculation based on the shifts), and generates the preferable reproduction clock shown in the bottom of FIG. 11. Alternatively, the reproduction clock generator 154 may generate clocks from the respective reproduction pulse waveforms and perform a compensation based on the detected shifts with respect to each of the generated clocks, to thereby generate the reproduction clock from the clocks.

As described above, in the modified example, even considering the shift of the reproduction pulse waveforms, the preferable reproduction clock can be generated with eliminating an adverse effect of the shift. Therefore, it is possible to prevent the increase of a jitter value, which indicates the quality of the data upon reproduction, and it is possible to realize the more preferable reproduction operation.

Moreover, the shift of timing of reversing the reproduction pulse waveforms is sometimes caused by that the relative position between the recording/reproducing head 110 and the dielectric recording medium 200 is shifted due to an influence of heat or the like, between upon the data recording and upon the data reproduction. The shift of timing of reversing the reproduction pulse waveforms in this case is generated as a steady shift, as in the case where the above-mentioned recording/reproducing head 110 relatively leans to the dielectric recording medium 200. Alternatively, the shift of timing of reversing the reproduction pulse waveforms is sometimes randomly generated by that a noise is mixed randomly when the detection signals RS1 to RS5 are inputted to the amplifiers 151a to 151e.

Even in this case, it is preferable to detect the delay amount as described above, and generate the preferable reproduction clock in view of the shift of timing of reversing the reproduction pulse waveforms.

Alternatively, the reproduction clock may be generated as follows, instead of detecting the delay amount. Specifically, steady values of the portions of the reproduction pulses where the shift does not exist are extracted. Then, the steady values are uniformed with respect to all the reproduction pulse waveforms. Then, clocks with a random dispersion are generated from the reproduction pulse waveforms, respectively. Then, by adding the clocks with the random dispersion, the reproduction clock which statistically approximates an average value may be generated.

Incidentally, in the above-mentioned embodiment, the cycle of the record clock and the cycle of the reproduction clock are constructed to be the same or substantially the same; however they may be different from each other. For example, the record signal WS1 to WS5 may be generated such that at least one of the pulse waveforms of the record signal WS1 to WS5 is reversed in every rising edge of the record clock (i.e. in every two inversions of the pulse waveform). In this case, if the record clock has 32 MHz, the reproduction clock having a half frequency of 16 MHz is generated, on the reproduction processing circuit 150. The point is that the reproduction clock can be preferably generated, as described above, as long as the record signals WS1 to WS5 are generated such that at least one of the pulse waveforms of the record signal WS1 to WS5 is reversed in synchronization with the frequency of the record clock or in every predetermined cycle regardless of the frequency of the record clock.

Moreover, this invention is not limited to be applied on the recording/reproducing apparatus or the like, as described above, but, for example, the same can be also applied to data transmission on a network. Namely, it is only necessary to generate transmission data on the basis of the above-mentioned recording operation on the transmission side of the network, and to process the transmission data on the basis of the above-mentioned reproduction operation on the reception side of the network. By this, on both the transmission side and the reception side of the network, it is possible to perform synchronization, relatively easily and preferably.

Moreover, without a limit to the above-mentioned length-modulation method, as long as the reproduction clock can be preferably obtained from the plurality of detection signals, various modulation methods other than the length-modulation method may be used.

Incidentally, in the above-mentioned embodiment, the specific driving methods of the dielectric recording medium 200 and the recording/reproducing head 110 are not fully mentioned; however, various driving methods can be adopted. For example, as described above, a driving method of driving the recording/reproducing head 110 in the radial direction of the dielectric recording medium 200 with respect to the dielectric recording medium 200 which is rotated by the spindle motor may be adopted. Alternatively, the dielectric recording medium 200 or the recording/reproducing head 110 may be driven by providing at least one of the dielectric recording medium 200 and the recording/reproducing head 110 for an x-y scanner or the like which can arbitrarily displace it along two perpendicular axes (e.g. along the recording surface of the dielectric recording medium 200). In this driving method, it is possible to perform the data recording operation and reproduction operation, relatively easily, by controlling a displacement in the x-axis direction and a displacement in the y-axis direction in accordance with a position of the recording area of the dielectric recording medium 200 where the data is to be recorded or where the data to be reproduced is recorded. Moreover, the dielectric recording medium 200 and the recording/reproducing head 110 may be driven in a z-axis direction (e.g. a direction perpendicular to the recording surface of the dielectric recording medium 200) in addition to the two axes of x and y, in order to adjust a distance between the dielectric recording medium 200 and the recording/reproducing head 110. Alternatively, without a limit to this, various driving methods used in various recording/reproducing apparatuses can be adopted, as long as if capable of properly recording of data into the dielectric recording medium 200 and reproducing of the data recorded in the dielectric recording medium 200 can be realized. Moreover, it is obvious that the shapes, structures, functions or the like of the dielectric recording medium 200 and the recording/reproducing head 110 can be changed depending on the adopted driving method, as occasion demands, as long as they fulfill the features of the present invention described above.

Moreover, in the above-mentioned embodiment, the dielectric material 217 is used for the recording layer; however, from the viewpoint of the presence or absence of the nonlinear dielectric constant and spontaneous polarization, the dielectric material 217 is preferably a ferroelectric substance.

Moreover, as the specific example of the recording/reproducing apparatus 100, the dielectric recording/reproducing apparatus for recording the data into the dielectric recording medium 200 or reproducing the data recorded in the dielectric recording medium 200 is used for the explanation. Of course, it is obvious that the above-mentioned various structures and configurations can be applied to the other various recording/reproducing apparatuses currently commercially available or under development.

Moreover, in the present invention, various changes may be made, if desired, without departing from the essence or spirit of the invention which can be read from the claims and the entire specification. A signal generating apparatus and method, a recording apparatus and method, a reproducing apparatus and method, a recording/reproducing apparatus and method, and a recording medium, which involve such changes, are also intended to be within the technical scope of the present invention.

INDUSTRIAL APPLICABILITY

The signal generating apparatus and method, the recording apparatus and method, the reproducing apparatus and method, the recording I reproducing apparatus and method, the computer program, and the recording medium of the preset invention can be applied to a generating apparatus for generating data to be recorded onto a recorder and data to be reproduced from a player, a recording apparatus provided with such a signal generating apparatus, a reproducing apparatus provided with such a signal generating apparatus, a recording/reproducing apparatus provided with such a signal generating apparatus, and a recording medium on which signals generated by the signal generating apparatus are recorded. Moreover, they can be applied to a signal generating apparatus, a recording/reproducing apparatus or the like which is mounted on various computer equipment for consumer use or for commercial use, or which can be connected to various computer equipment.

I claim:

1. A reproducing apparatus for reproducing a plurality of record signals recorded by a recording apparatus which includes a plurality of recording devices, each of which records a corresponding record signal of the plurality of the record signals in parallel and in synchronization with a record clock, and a signal generating device for generating each of the plurality of record signals in association with the corresponding recording device such that a reproduction clock synchronized with the record clock can be generated on the basis of the plurality of record signals respectively reproduced in parallel, if the plurality of record signals are reproduced in parallel, the reproducing apparatus comprising:
   a plurality of reproducing devices, each of which reproduces a corresponding record signal of the plurality of the record signals in parallel; and
   a clock generating device for generating a reproduction clock synchronized with the record clock and commonly used in the reproduction of the plurality of record signals, on the basis of the plurality of record signals respectively reproduced in parallel, wherein
   the plurality of record signals are generated such that a reversed edge appears on a waveform of at least one of the plurality of record signals in every time unit synchronized with the record clock, and
   the clock generating device generates the reproduction clock by sampling the reversed edge which appears on the waveform of the at least one of the plurality of record signals.

2. A reproducing apparatus comprising:
   a plurality of reproducing devices, each of which reproduces a corresponding record signal of a plurality of record signals in parallel; and
   a clock generating device for generating a reproduction clock commonly used on the reproducing apparatus, on the basis of the plurality of record signals respectively reproduced in parallel, wherein
   the clock generating device generates the reproduction clock by sampling a reversed edge which appears on a waveform of at least one of the plurality of record signals.

3. A reproducing method comprising:
   a plurality of reproducing processes, each of which reproduces a corresponding record signal of a plurality of record signals in parallel; and
   a clock generating process of generating a reproduction clock commonly used in the reproducing method, on the basis of the plurality of record signals respectively reproduced in parallel, wherein
   the clock generating process generates the reproduction clock by sampling a reversed edge which appears on a waveform of at least one of the plurality of record signals.

4. A recording/reproducing apparatus comprising:
   a plurality of recording devices, each of which records a corresponding record signal of a plurality of record signals in parallel and in synchronization with a record clock;
   a signal generating device for generating each of the plurality of record signals in association with the corresponding recording device such that a reproduction clock synchronized with the record clock can be generated on the basis of the plurality of record signals reproduced in parallel, if the plurality of record signals are reproduced in parallel;
   a plurality of reproducing devices, each of which reproduces the corresponding record signal of the plurality of the record signals in parallel; and
   a clock generating device for generating a reproduction clock synchronized with the record clock, on the basis of the plurality of record signals respectively reproduced in parallel, wherein
   the plurality of record signals are generated such that a reversed edge appears on a waveform of at least one of the plurality of record signals in every time unit synchronized with the record clock, and
   the clock generating device generates the reproduction clock by sampling the reversed edge which appears on the waveform of the at least one of the plurality of record signals.

5. A recording/reproducing method comprising:
   a plurality of recording processes, each of which records a corresponding record signal of a plurality of record signals in parallel and in synchronization with a record clock;
   a signal generating process of generating each of the plurality of record signals in association with the corresponding recording device such that a reproduction clock synchronized with the record clock can be generated on the basis of the plurality of record signals reproduced in parallel, if the plurality of record signals are reproduced in parallel;
   a plurality of reproducing processes, each of which reproduces a corresponding record signal of the plurality of the record signals in parallel; and
   a clock generating process of generating a reproduction clock synchronized with the record clock, on the basis of the plurality of record signals respectively reproduced in parallel, wherein
   the plurality of record signals are generated such that a reversed edge appears on a waveform of at least one of the plurality of record signals in every time unit synchronized with the record clock, and
   the clock generating process generates the reproduction clock by sampling the reversed edge which appears on the waveform of the at least one of the plurality of record signals.

6. A non-transitory computer readable medium recording thereon a computer program comprising instructions executable by a computer provided in a recording/reproducing apparatus, to make the computer function as at least one portion of a signal generating device and a clock generating device, the recording/reproducing apparatus comprising:

a plurality of recording devices, each of which records a corresponding record signal of a plurality of record signals in parallel and in synchronization with a record clock;

the signal generating device for generating each of the plurality of record signals in association with the corresponding recording device such that a reproduction clock synchronized with the record clock can be generated on the basis of the plurality of record signals reproduced in parallel, if the plurality of record signals are reproduced in parallel;

a plurality of reproducing devices, each of which reproduces the corresponding record signal of the plurality of the record signals in parallel; and the clock generating device for generating a reproduction clock synchronized with the record clock, on the basis of the plurality of record signals respectively reproduced in parallel, wherein the plurality of record signals are generated such that a reversed edge appears on a waveform of at least one of the plurality of record signals in every time unit synchronized with the record clock, and the clock generating device generates the reproduction clock by sampling the reversed edge which appears on the waveform of the at least one of the plurality of record signals.

* * * * *